(12) United States Patent
Choi et al.

(10) Patent No.: US 12,707,101 B2
(45) Date of Patent: Aug. 11, 2026

(54) CHANNEL DYNAMIC RANGE ADJUSTMENT METHOD FOR FEATURE TENSOR COMPRESSION IN SPLIT INFERENCE

(71) Applicant: InterDigital VC Holdings, Inc., Wilmington, DE (US)

(72) Inventors: Hyomin Choi, Sunnyvale, CA (US); Fabien Racape, San Francisco, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/634,294

(22) Filed: Apr. 12, 2024

(65) Prior Publication Data

US 2025/0324106 A1 Oct. 16, 2025

(51) Int. Cl.
*H04N 19/98* (2014.01)
*H04N 19/157* (2014.01)

(52) U.S. Cl.
CPC .......... *H04N 19/98* (2014.11); *H04N 19/157* (2014.11)

(58) Field of Classification Search
CPC ............................ H04N 19/98; H04N 19/157
See application file for complete search history.

(56) References Cited

U.S. PATENT DOCUMENTS 12,058,333 B1 * 8/2024 Li ...................... G01S 13/9021
2018/0350110 A1 * 12/2018 Cho ......................... G06F 7/08
2022/0394503 A1 12/2022 He
2023/0082561 A1 * 3/2023 Kim .................. H04N 19/1883 375/240.03
2024/0282013 A1 * 8/2024 Pang .................... G06N 3/0455
2024/0422315 A1 * 12/2024 Wang .................. H04N 19/176
(Continued)

FOREIGN PATENT DOCUMENTS

GB 2577350 A 3/2020
WO 2021/248456 A1 12/2021

OTHER PUBLICATIONS

Cui, et al., "Asymmetric Gained Deep Image Compression with Continuous Rate Adaptation", Proceedings of the IEEE/CVF Conference on Computer Vision and Pattern Recognition, 2021, 10 pages.

(Continued)

*Primary Examiner* — Tracy Y. Li
(74) *Attorney, Agent, or Firm* — Condo Roccia Koptiw LLP

(57) ABSTRACT

Systems, methods, and instrumentalities are disclosed for performing channel dynamic range adjustment and/or channel dynamic range restoration associated with feature tensor compression in split inference. Range adjustment associated with a channel associated with a feature tensor may be performed. Range adjustment may include a shift and/or scale operation. Range adjustment model(s) (e.g., shift and/or scale parameters) may be determined, for example, based on optimization during encoding. The range adjustment model(s) may be used to adapt distributions between channels for a tensor packed frame. The range adjustment model(s) may be channel-level parameters (e.g., a range adjustment model may be associated with a specific channel; a range adjustment model may be per-channel).

20 Claims, 17 Drawing Sheets

(56) References Cited

U.S. PATENT DOCUMENTS

2025/0133223 A1* 4/2025 Gaikov ................ H04N 19/136

OTHER PUBLICATIONS

Gao, et al., "Recent Standard Development Activities on Video Coding for Machines", arXiv, Online Available: http://arxiv.org/abs/2105.12653, May 26, 2021,13 pages.

ISO/IEC, "Algorithm Description of FCTM", ISO/IEC JTC 1/SC 29/WG 4 N0460, MPEG Video Coding, Online, Jan. 2024, 17 pages.

ISO/IEC, "Common test and training conditions for FCM", ISO/IEC JTC 1/SC 29/WG 4 N00459, MPEG Video Coding, Online, Jan. 2024, 24 pages.

Choi et al., "[FCM] CE2-related: Scale and Shift Parameters for Channel-wise Dynamic Range", 146. MPEG Meeting; Apr. 22, 2024-Apr. 26, 2024, Rennes, (Motion Picture Expert Group or ISO/IEC JTC1/SC29/WG1), No. m67766, Apr. 19, 2024.

ISO/IEC, "Algorithm Description of FCTM", 145. Mpeg Meeting; Jan. 22, 2024-Jan. 26, 2024, Online, (Motion Picture Expert Group or ISO/IEC JTC1/SC29/WG11) No. N23653, Feb. 18, 2024.

ISO/IEC, "Information Technology—Learning-based Image Coding (JPEG AI)—Part 1: Lossy Image Compression; TD-GEN-0168", Study Group 16, Series TD-GEN-0168, International Telecommunication Union, Geneva, CH, Mar. 7, 2023.

JPEG AI, "White Paper on JPEG AI Scope and Framework", Version 1.0, JPEG.org, Jan. 2021, 4 pages.

* cited by examiner

CHANNEL DYNAMIC RANGE ADJUSTMENT METHOD FOR FEATURE TENSOR COMPRESSION IN SPLIT INFERENCE

BACKGROUND

Video coding systems may be used to compress digital video signals, e.g., to reduce the storage and/or transmission bandwidth needed for such signals. Video coding systems may include, for example, block-based, wavelet-based, and/or object-based systems.

SUMMARY

Systems, methods, and instrumentalities are disclosed for performing channel dynamic range adjustment and/or channel dynamic range restoration associated with feature tensor compression in split inference. Range adjustment associated with a channel associated with a feature tensor may be performed. Range adjustment may include a shift and/or scale operation. Range adjustment model(s) (e.g., shift and/or scale parameters) may be determined, for example, based on optimization during encoding. The range adjustment model(s) may be used to adapt distributions between channels for a tensor packed frame. The range adjustment model(s) may be channel-level parameters (e.g., a range adjustment model may be associated with a specific channel; a range adjustment model may be per-channel).

A device (e.g., encoding device, decoding device) may perform feature conversion and/or inverse feature conversion associated with channel dynamic range adjustment (CDRA) and/or channel dynamic range restoration (CDRR). The device may perform CDRA and/or CDRR. The device may obtain a feature tensor. The feature tensor may be associated with a video. The feature tensor may be associated with feature reduction. The device may determine whether to use CDRA on the feature tensor. The device may generate a normalized feature tensor based on the feature tensor. The normalized feature tensor may be generated (e.g., determined) based on a minimum value and a maximum value associated with the feature tensor. The minimum value may be zero (0), for example, if CDRA is determined to be used on the feature tensor. The device may (e.g., based on a determination to use CDRA on the feature tensor), perform a CDRA using the normalized feature tensor. CDRA may include adjusting the range associated with a channel associated with the feature tensor. The CDRA may include using a first range adjustment model (e.g., first scale parameter and a first shift parameter). The CDRA may include using a second range adjustment model (e.g., second scale parameter and second shift parameter). The first range adjustment model may be associated with a first channel associated with the feature tensor. The CDRA may include using a second range adjustment model (e.g., associated with a second channel associated with the feature tensor). The range adjustment model(s) may be channel-level model (s). The range adjustment models (e.g., scale and/or shift parameters associated with a respective range adjustment model) may be determined. The range adjustment model(s) may be a linear model, a logarithmic model, and/or the like. A range adjustment model may be associated with a channel (e.g., first range adjustment model associated with the first channel, second range adjustment model associated with the second channel, etc.). The device may determine a tensor packed frame, for example, based on the performed CDRA. The device may send (e.g., in video data or a bitstream) the tensor packed frame. The device may determine an adjusted feature tensor based on the performed CDRA. The device may send (e.g., in video data or a bitstream) a CDRA/CDRR indication. The CDRA/CDRR indication may indicate one or more of the following: to bypass using CDRR associated with the tensor packed frame or feature tensor; the first range adjustment model, the second range adjustment model, and an indication to use the first range adjustment model and second range adjustment model for CDRR associated with the feature tensor; to use a previously decoded range adjustment model for CDRR; to use a pre-configured range adjustment model for CDRR; etc. The range adjustment model may be indicated, for example, in a floating point precision.

A device (e.g., decoding device, encoding device) may perform feature conversion and/or inverse feature conversion associated with channel dynamic range adjustment (CDRA) and/or channel dynamic range restoration (CDRR). The device may obtain a feature tensor (e.g., tensor packed frame). The device may obtain an indication that indicates that CDRA was used on the tensor packed frame. The device may unpack the tensor packed frame, for example, to determine an unpacked feature tensor. The device may (e.g., based on an indication that indicates that CDRA was used on the tensor packed frame) perform a CDRR on the feature tensor (e.g., unpacked feature tensor). The CDRR may be performed using a first range adjustment model and/or a second range adjustment model (e.g., where the first range adjustment model is associated with the first channel; wherein the second range adjustment model is associated with the second channel). The device may obtain an indication that indicates the range adjustment models (e.g., first range adjustment model, second range adjustment model, etc.) to use for CDRR. The device may obtain an indication that indicates the range adjustment model in a floating point precision. For example, the device may obtain the CDRR indication (e.g., as described herein). The device may determine reconstructed features based on the CDRR. The device may decode the video, for example, based on the reconstructed features and/or performed CDRR.

Systems, methods, and instrumentalities described herein may involve a decoder. In some examples, the systems, methods, and instrumentalities described herein may involve an encoder. In some examples, the systems, methods, and instrumentalities described herein may involve a signal (e.g., from an encoder and/or received by a decoder). A computer-readable medium may include instructions for causing one or more processors to perform methods described herein. A computer program product may include instructions which, when the program is executed by one or more processors, may cause the one or more processors to carry out the methods described herein.

DETAILED DESCRIPTION

A more detailed understanding may be had from the following description, given by way of example in conjunction with the accompanying drawings.

Figure 1A:
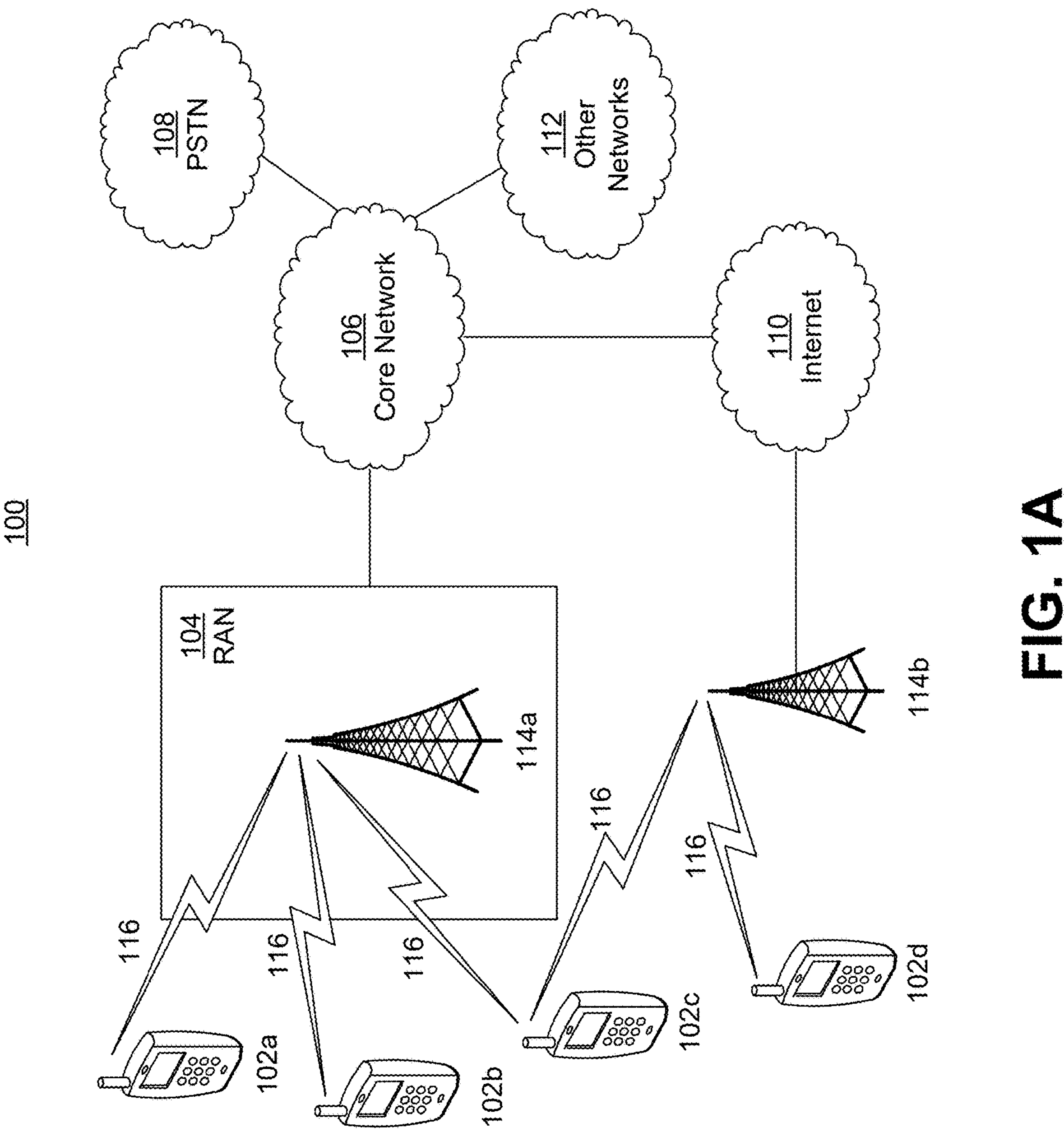
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
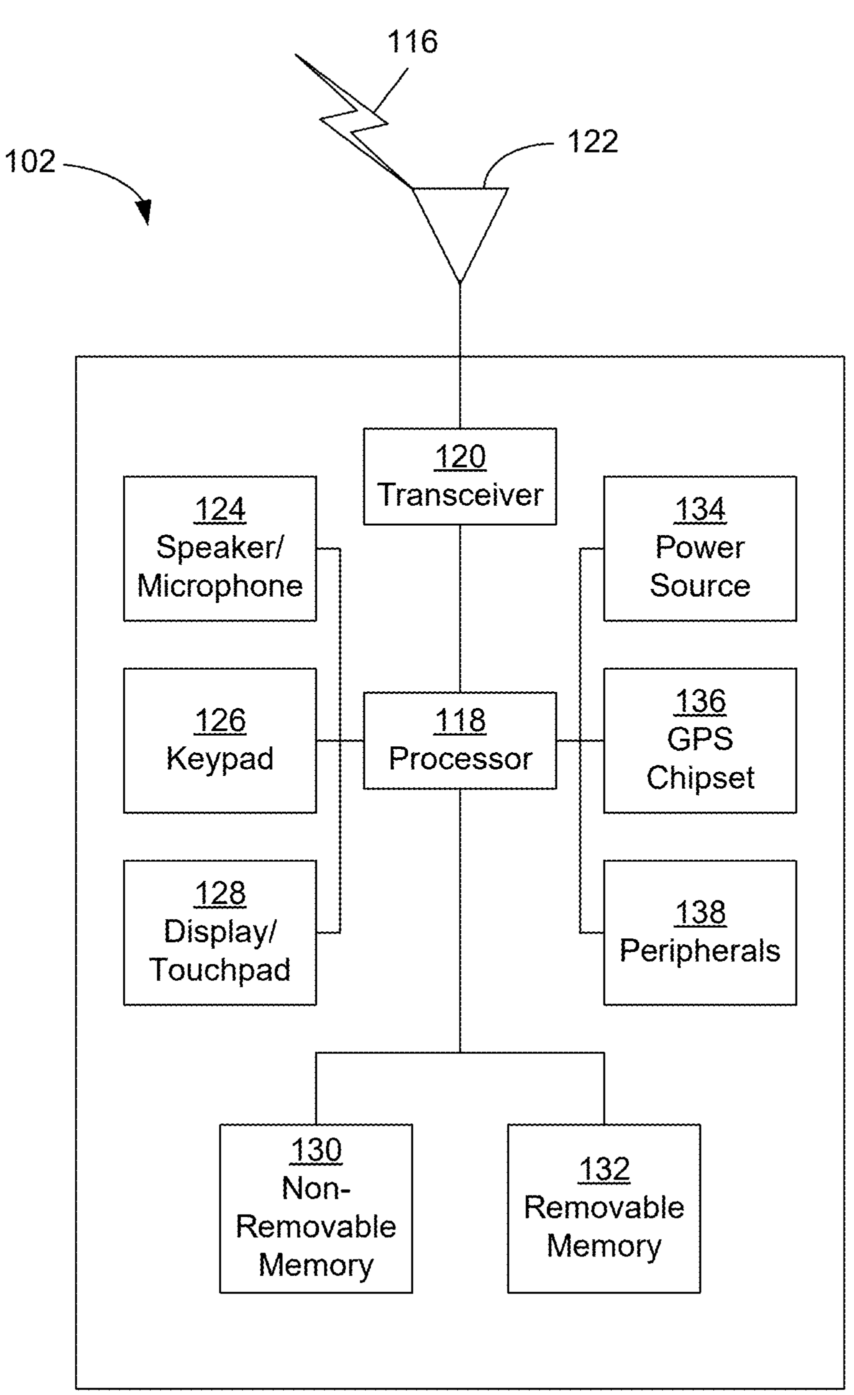
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

Figure 1C:
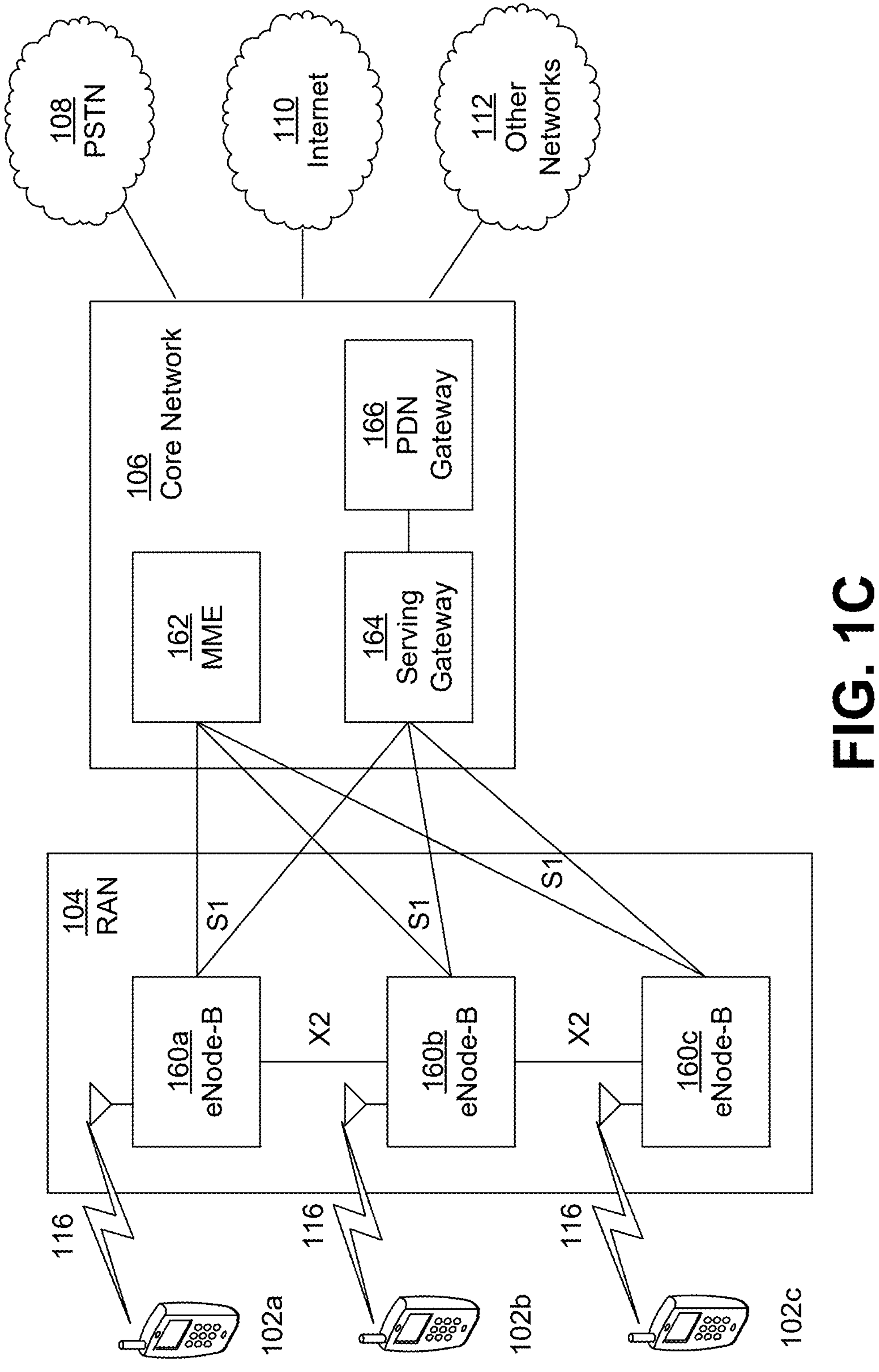
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
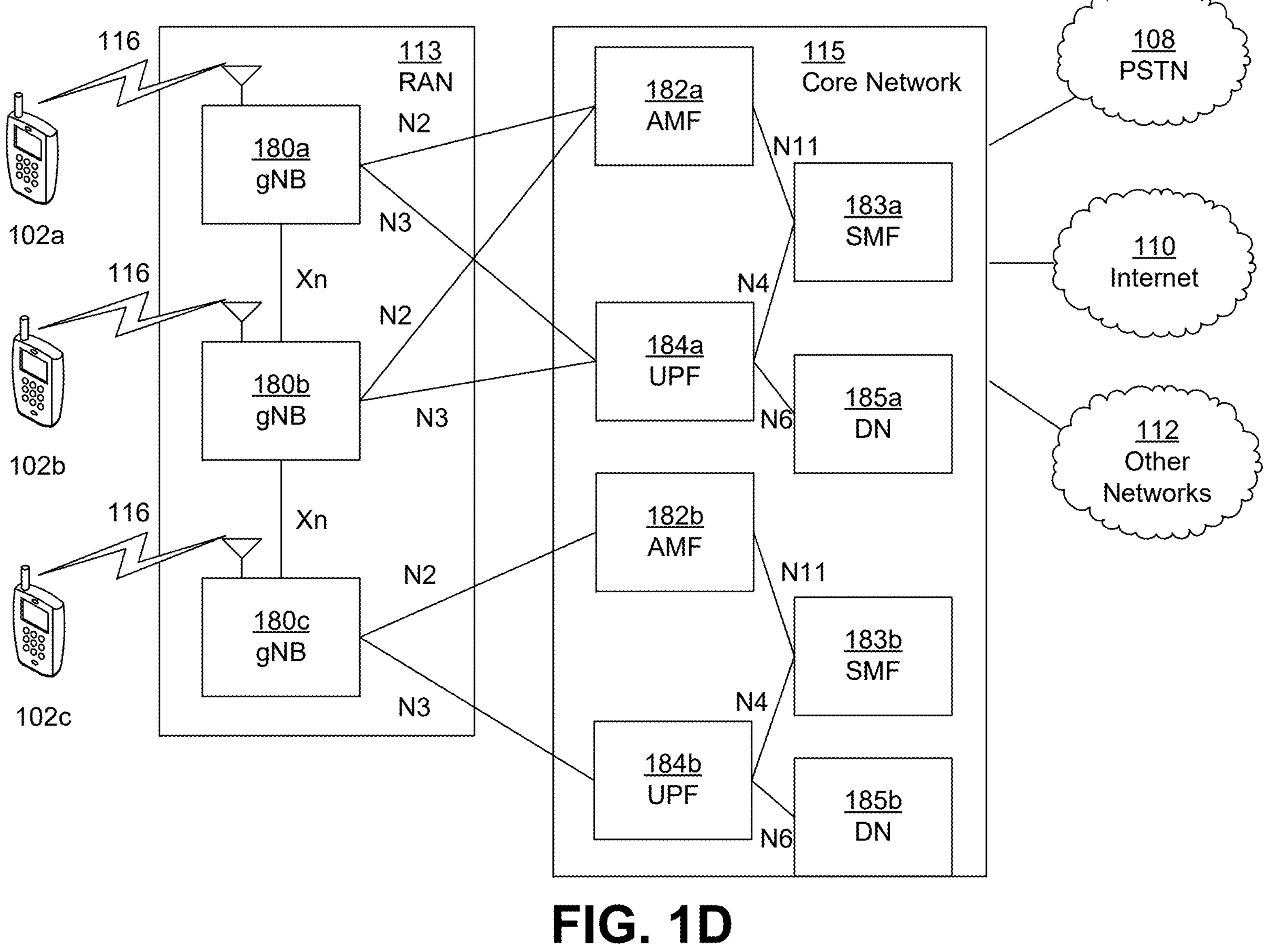
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

This application describes a variety of aspects, including tools, features, examples, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects may be combined and interchanged to provide further aspects. Moreover, the aspects may be combined and interchanged with aspects described in earlier filings as well.

The aspects described and contemplated in this application may be implemented in many different forms. FIGS. 5-14 described herein may provide some examples, but other examples are contemplated. The discussion of FIGS. 5-14 does not limit the breadth of the implementations. At least one of the aspects generally relates to video encoding and decoding, and at least one other aspect generally relates to transmitting a bitstream generated or encoded. These and other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various examples to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 2:
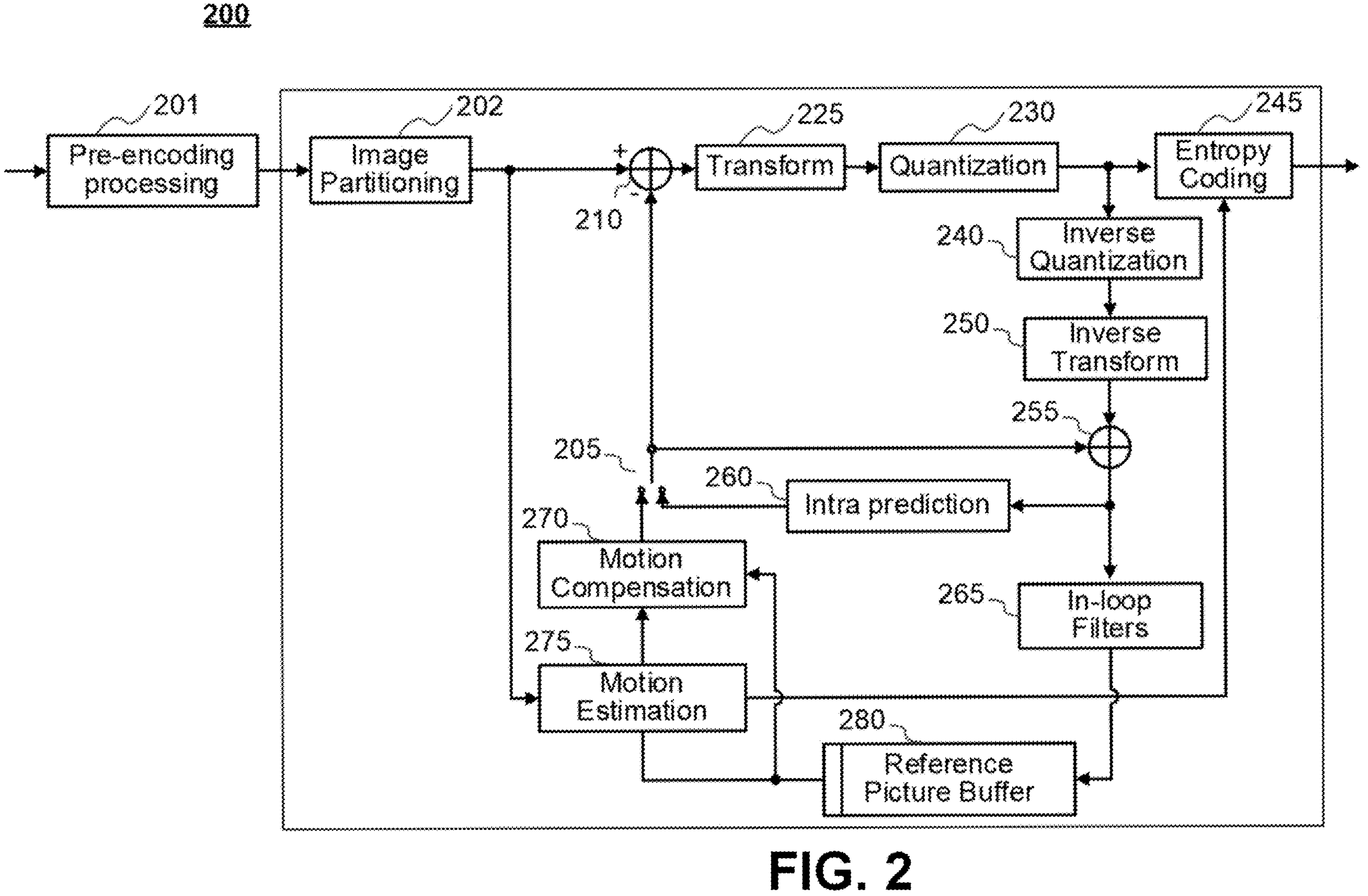
FIG. 2 illustrates an example video encoder.
Figure 3:
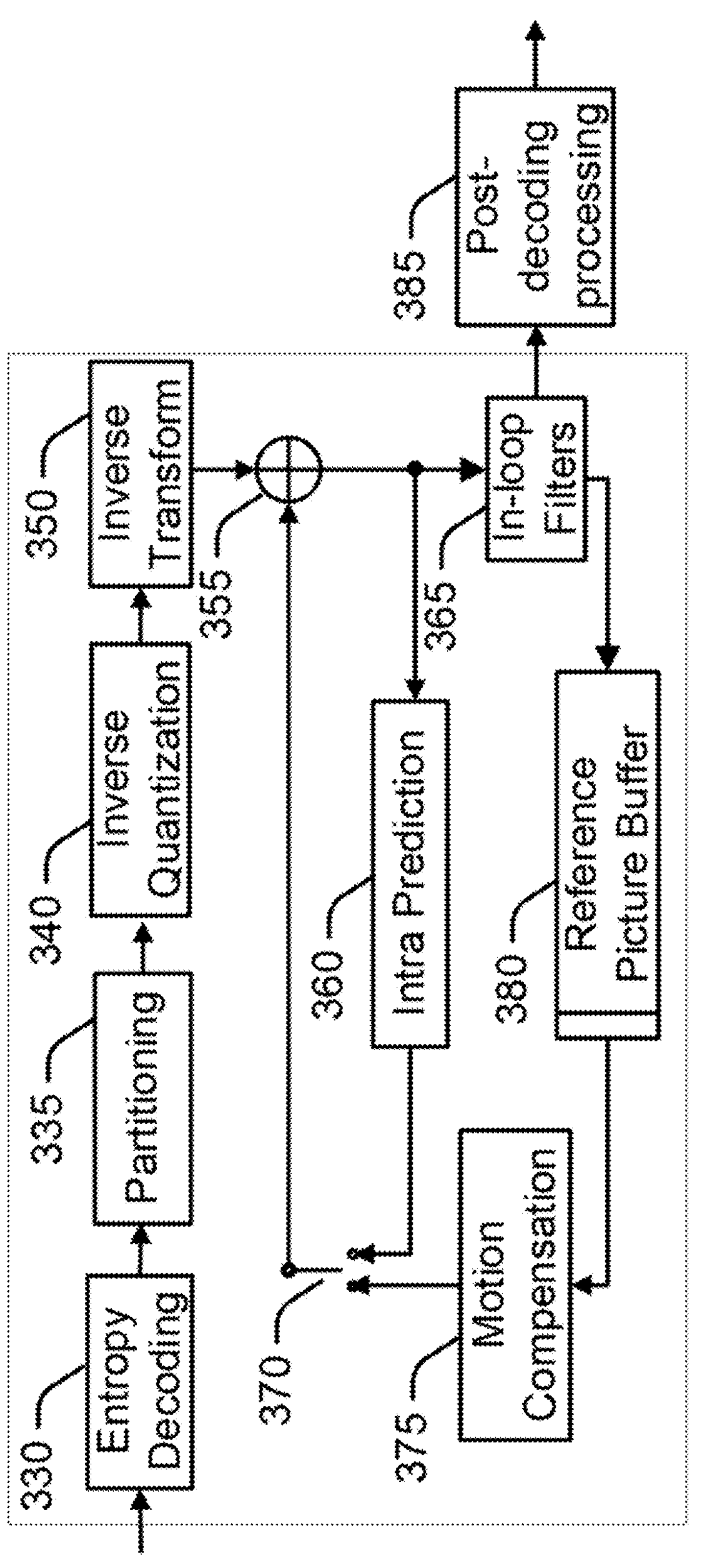
FIG. 3 illustrates an example video decoder.

Various methods and other aspects described in this application may be used to modify modules, for example, decoding modules, of a video encoder 200 and decoder 300 as shown in FIG. 2 and FIG. 3. Moreover, the subject matter disclosed herein may be applied, for example, to any type, format or version of video coding, whether described in a standard or a recommendation, whether pre-existing or future-developed, and extensions of any such standards and recommendations. Unless indicated otherwise, or technically precluded, the aspects described in this application may be used individually or in combination.

Various numeric values are used in examples described the present application. These and other specific values are for purposes of describing examples and the aspects described are not limited to these specific values.

FIG. 2 is a diagram showing an example video encoder. Variations of example encoder 200 are contemplated, but the encoder 200 is described below for purposes of clarity without describing all expected variations.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing, and attached to the bitstream.

In the encoder 200, a picture is encoded by the encoder elements as described below. The picture to be encoded is partitioned (202) and processed in units of, for example, coding units (CUs). Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

FIG. 3 is a diagram showing an example of a video decoder. In example decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which may be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream. In an example, the decoded images (e.g., after application of the in-loop filters (365) and/or after post-decoding processing (385), if post-decoding processing is used) may be sent to a display device for rendering to a user.

Figure 4:
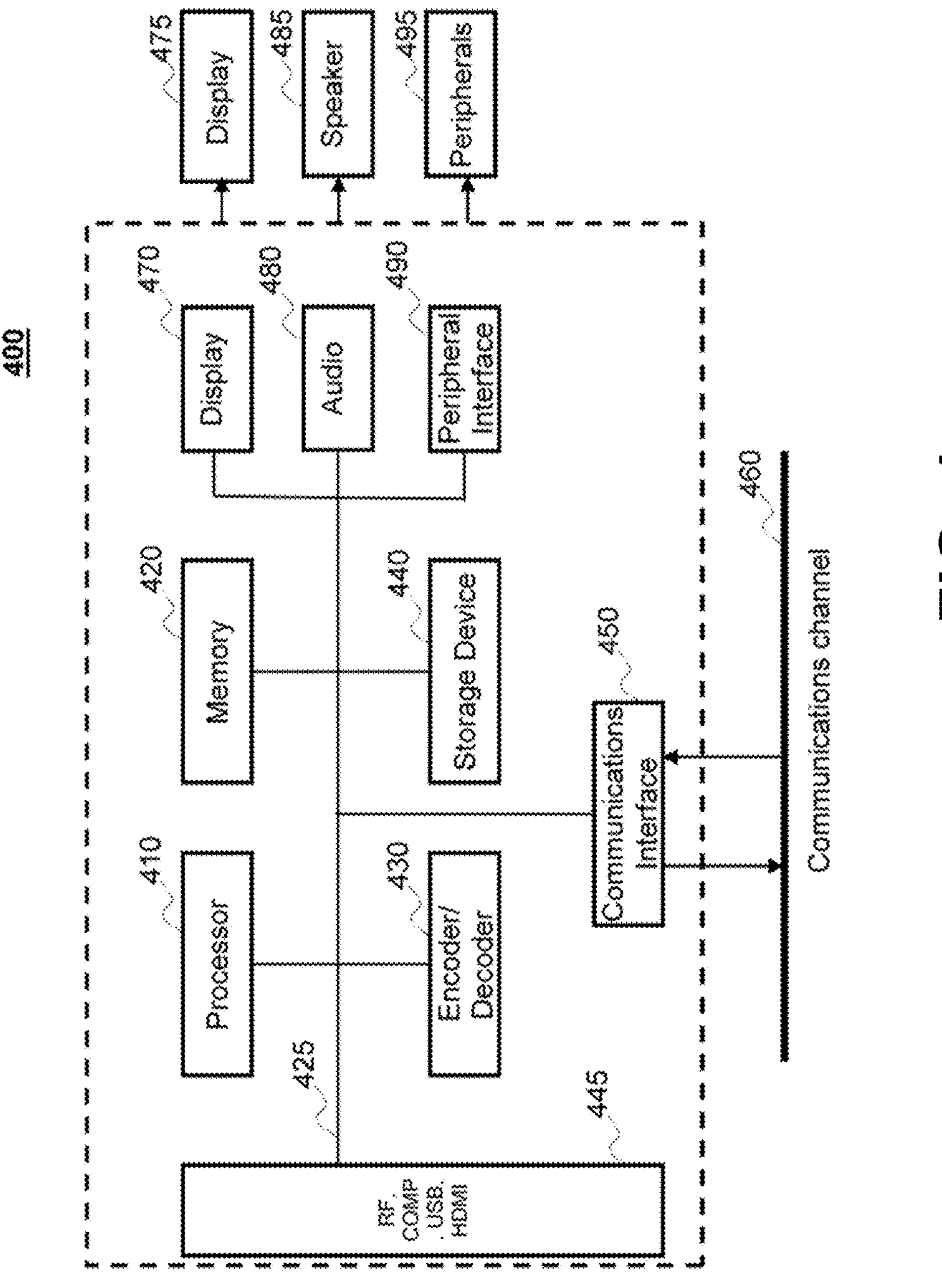
FIG. 4 illustrates an example of a system in which various aspects and examples may be implemented.

FIG. 4 is a diagram showing an example of a system in which various aspects and examples described herein may be implemented. System 400 may be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 400, singly or in combination, may be embodied in a single integrated circuit (IC), multiple ICs, and/or discrete components. For example, in at least one example, the processing and encoder/decoder elements of system 400 are distributed across multiple ICs and/or discrete components. In various examples, the system 400 is communicatively coupled to one or more other systems, or other electronic devices, via, for example, a communications bus or through dedicated input and/or output ports. In various examples, the system 400 is configured to implement one or more of the aspects described in this document.

The system 400 includes at least one processor 410 configured to execute instructions loaded therein for implementing, for example, the various aspects described in this document. Processor 410 can include embedded memory, input output interface, and various other circuitries as known in the art. The system 400 includes at least one memory 420 (e.g., a volatile memory device, and/or a non-volatile memory device). System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 can include an internal storage device, an attached storage device (including detachable and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that may be included in a device to perform the encoding and/or decoding functions. As is known, a device can include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in this document may be stored in storage device 440 and subsequently loaded onto memory 420 for execution by processor 410. In accordance with various examples, one or more of processor 410, memory 420, storage device 440, and encoder/decoder module 430 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some examples, memory inside of the processor 410 and/or the encoder/decoder module 430 is used to store instructions and to provide working memory for processing that is needed during encoding or decoding. In other examples, however, a memory external to the processing device (for example, the processing device may be either the processor 410 or the encoder/decoder module 430) is used for one or more of these functions. The external memory may be the memory 420 and/or the storage device 440, for example, a dynamic volatile memory and/or a non-volatile flash memory. In several examples, an external non-volatile flash memory is used to store the operating system of, for example, a television. In at least one example, a fast external dynamic volatile memory such as a RAM is used as working memory for video encoding and decoding operations.

The input to the elements of system 400 may be provided through various input devices as indicated in block 445. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 4, include composite video.

In various examples, the input devices of block 445 have associated respective input processing elements as known in the art. For example, the RF portion may be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which may be referred to as a channel in certain examples, (iv) demodulating the downconverted and band-limited signal, (v) performing error correction, and/or (vi) demultiplexing to select the desired stream of data packets. The RF portion of various examples includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box example, the RF portion and its associated input processing element receives an RF signal transmitted over a wired (for example, cable) medium, and performs frequency selection by filtering, downconverting, and filtering again to a desired frequency band. Various examples rearrange the order of the above-described (and other) elements, remove some of these elements, and/or add other elements performing similar or different functions. Adding elements can include inserting elements in between existing elements, such as, for example, inserting amplifiers and an analog-to-digital converter. In various examples, the RF portion includes an antenna.

The USB and/or HDMI terminals can include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream is provided to various processing elements, including, for example, processor 410, and encoder/decoder 430 operating in combination with the memory and storage elements to process the datastream as necessary for presentation on an output device.

Various elements of system 400 may be provided within an integrated housing, Within the integrated housing, the various elements may be interconnected and transmit data therebetween using suitable connection arrangement 425, for example, an internal bus as known in the art, including the Inter-IC (12C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 may be implemented, for example, within a wired and/or a wireless medium.

Data is streamed, or otherwise provided, to the system 400, in various examples, using a wireless network such as a Wi-Fi network, for example IEEE 802.11 (IEEE refers to the Institute of Electrical and Electronics Engineers). The Wi-Fi signal of these examples is received over the communications channel 460 and the communications interface 450 which are adapted for Wi-Fi communications. The communications channel 460 of these examples is typically connected to an access point or router that provides access to external networks including the Internet for allowing streaming applications and other over-the-top communications. Other examples provide streamed data to the system 400 using a set-top box that delivers the data over the HDMI connection of the input block 445. Still other examples provide streamed data to the system 400 using the RF connection of the input block 445. As indicated above, various examples provide data in a non-streaming manner. Additionally, various examples use wireless networks other than Wi-Fi, for example a cellular network or a Bluetooth® network.

The system 400 can provide an output signal to various output devices, including a display 475, speakers 485, and other peripheral devices 495. The display 475 of various examples includes one or more of, for example, a touchscreen display, an organic light-emitting diode (OLED) display, a curved display, and/or a foldable display. The display 475 may be for a television, a tablet, a laptop, a cell phone (mobile phone), or other device. The display 475 can also be integrated with other components (for example, as in a smart phone), or separate (for example, an external monitor for a laptop). The other peripheral devices 495 include, in various examples, one or more of a stand-alone digital video disc (or digital versatile disc) (DVD, for both terms), a disk player, a stereo system, and/or a lighting system. Various examples use one or more peripheral devices 495 that provide a function based on the output of the system 400. For example, a disk player performs the function of playing the output of the system 400.

In various examples, control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices may be communicatively coupled to system 400 via dedicated connections through respective interfaces 470, 480, and 490. Alternatively, the output devices may be connected to system 400 using the communications channel 460 via the communications interface 450. The display 475 and speakers 485 may be integrated in a single unit with the other components of system 400 in an electronic device such as, for example, a television. In various examples, the display interface 470 includes a display driver, such as, for example, a timing controller (T Con) chip.

The display 475 and speakers 485 can alternatively be separate from one or more of the other components, for example, if the RF portion of input 445 is part of a separate set-top box. In various examples in which the display 475 and speakers 485 are external components, the output signal may be provided via dedicated output connections, including, for example, HDMI ports, USB ports, or COMP outputs.

The examples may be carried out by computer software implemented by the processor 410 or by hardware, or by a combination of hardware and software. As a non-limiting example, the examples may be implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various examples, such processes include one or more of the processes typically performed by a decoder, for example, entropy decoding, inverse quantization, inverse transformation, and differential decoding. In various examples, such processes also, or alternatively, include processes performed by a decoder of various implementations described in this application, for example, obtaining a tensor packed frame, obtaining an indication that indicates that channel dynamic range adjustment (CDRA) was used on the tensor packed frame, unpacking the tensor packed frame (e.g., to determine an unpacked feature tensor), performing a channel dynamic range restoration (CDRR) (e.g., using a scale parameter and a shift parameter) on the unpacked feature tensor (e.g., based on the indication that CDRA was used on the tensor packed frame), determining reconstructed features based on the CDRR performed, performing at least one decoding function based on the reconstructed features, etc.

As further examples, in one example "decoding" refers only to entropy decoding, in another example "decoding" refers only to differential decoding, and in another example "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various examples, such processes include one or more of the processes typically performed by an encoder, for example, partitioning, differential encoding, transformation, quantization, and entropy encoding. In various examples, such processes also, or alternatively, include processes performed by an encoder of various implementations described in this application, for example, obtaining a feature tensor associated with feature reduction, determining whether to use CDRA on the feature tensor associated with feature reduction, generating a normalize feature tensor (e.g., based on a minimum value and a maximum value associated with the feature tensor), performing (e.g., based on a determination to use CDRA on the feature tensor) a CDRA (e.g., using the normalized feature tensor, scale parameter, shift parameter, etc.), determining a tensor packed frame based on the CDRA, sending (e.g., in video data) the tensor packed frame and a CDRR indication, etc.

As further examples, in one example "encoding" refers only to entropy encoding, in another example "encoding" refers only to differential encoding, and in another example "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that syntax elements as used herein, for example, coding syntax on feature reduction, CDRA, CDRR, scale parameters, shift parameters, CDRR indication (e.g., mode indication), etc., are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein may be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one example" or "an example" or "one implementation" or "an implementation", as well as other variations thereof, means that a particular feature, structure, characteristic, and so forth described in connection with the example is included in at least one example. Thus, the appearances of the phrase "in one example" or "in an example" or "in one implementation" or "in an implementation", as well any other variations, appearing in various places throughout this application are not necessarily all referring to the same example.

Additionally, this application may refer to "determining" various pieces of information. Determining the information can include one or more of, for example, estimating the information, calculating the information, predicting the information, or retrieving the information from memory. Obtaining may include receiving, retrieving, constructing, generating, and/or determining.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. Encoder signals may include, for example, a tensor packed frame, a channel dynamic range restoration (CDRR) indication, a scale parameter (e.g., first and/or second scale parameter), a shift parameter (e.g., first and/or second shift parameter), a minimum value, a maximum value, etc. In this way, in an example the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various examples. It is to be appreciated that signaling may be accomplished in a variety of ways. For example, one or more syntax elements, flags, and so forth are used to signal information to a corresponding decoder in various examples. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information can include, for example, instructions for performing a method, or data produced by one of the described implementations. For example, a signal may be formatted to carry the bitstream of a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on, or accessed or received from, a processor-readable medium.

Many examples are described herein. Features of examples may be provided alone or in any combination, across various claim categories and types. Further, examples may include one or more of the features, devices, or aspects described herein, alone or in any combination, across various claim categories and types. For example, features described herein may be implemented in a bitstream or signal that includes information generated as described herein. The information may allow a decoder to decode a bitstream, the encoder, bitstream, and/or decoder according to any of the embodiments described. For example, features described herein may be implemented by creating and/or transmitting and/or receiving and/or decoding a bitstream or signal. For example, features described herein may be implemented a method, process, apparatus, medium storing instructions, medium storing data, or signal. For example, features described herein may be implemented by a TV, set-top box, cell phone, tablet, or other electronic device that performs decoding. The TV, set-top box, cell phone, tablet, or other electronic device may display (e.g. using a monitor, screen, or other type of display) a resulting image (e.g., an image from residual reconstruction of the video bitstream). The TV, set-top box, cell phone, tablet, or other electronic device may receive a signal including an encoded image and perform decoding.

Systems, methods, and instrumentalities are disclosed for performing channel dynamic range adjustment and/or channel dynamic range restoration associated with feature tensor compression in split inference. Range adjustment associated with a channel associated with a feature tensor may be performed. Range adjustment may include a shift and/or scale operation. Range adjustment model(s) (e.g., shift and/or scale parameters) may be determined, for example, based on optimization during encoding. The range adjustment model(s) may be used to adapt distributions between channels for a tensor packed frame. The range adjustment model(s) may be channel-level parameters (e.g., a range adjustment model may be associated with a specific channel; a range adjustment model may be per-channel).

A device (e.g., encoding device, decoding device) may perform feature conversion and/or inverse feature conversion associated with channel dynamic range adjustment (CDRA) and/or channel dynamic range restoration (CDRR). The device may perform CDRA and/or CDRR. The device may obtain a feature tensor. The feature tensor may be associated with a video. The feature tensor may be associated with feature reduction. The device may determine whether to use CDRA on the feature tensor. The device may generate a normalized feature tensor based on the feature tensor. The normalized feature tensor may be generated (e.g., determined) based on a minimum value and a maximum value associated with the feature tensor. The minimum value may be zero (0), for example, if CDRA is determined to be used on the feature tensor. The device may (e.g., based on a determination to use CDRA on the feature tensor), perform a CDRA using the normalized feature tensor. CDRA may include adjusting the range associated with a channel associated with the feature tensor. The CDRA may include using a first range adjustment model (e.g., first scale parameter and a first shift parameter). The CDRA may include using a second range adjustment model (e.g., second scale parameter and second shift parameter). The first range adjustment model may be associated with a first channel associated with the feature tensor. The CDRA may include using a second range adjustment model (e.g., associated with a second channel associated with the feature tensor). The range adjustment model(s) may be channel-level model (s). The range adjustment models (e.g., scale and/or shift parameters associated with a respective range adjustment model) may be determined. The range adjustment model(s) may be a linear model, a logarithmic model, and/or the like. A range adjustment model may be associated with a channel (e.g., first range adjustment model associated with the first channel, second range adjustment model associated with the second channel, etc.). The device may determine a tensor packed frame, for example, based on the performed CDRA. The device may send (e.g., in video data or a bitstream) the tensor packed frame. The device may determine an adjusted feature tensor based on the performed CDRA. The device may send (e.g., in video data or a bitstream) a CDRA/CDRR indication. The CDRA/CDRR indication may indicate one or more of the following: to bypass using CDRR associated with the tensor packed frame or feature tensor; the first range adjustment model, the second range adjustment model, and an indication to use the first range adjustment model and second range adjustment model for CDRR associated with the feature tensor; to use a previously decoded range adjustment model for CDRR; to use a pre-configured range adjustment model for CDRR; etc. The range adjustment model may be indicated, for example, in a floating point precision.

A device (e.g., decoding device, encoding device) may perform feature conversion and/or inverse feature conversion associated with channel dynamic range adjustment (CDRA) and/or channel dynamic range restoration (CDRR). The device may obtain a feature tensor (e.g., tensor packed frame). The device may obtain an indication that indicates that CDRA was used on the tensor packed frame. The device may unpack the tensor packed frame, for example, to determine an unpacked feature tensor. The device may (e.g., based on an indication that indicates that CDRA was used on the tensor packed frame) perform a CDRR on the feature tensor (e.g., unpacked feature tensor). The CDRR may be performed using a first range adjustment model and/or a second range adjustment model (e.g., where the first range adjustment model is associated with the first channel; wherein the second range adjustment model is associated with the second channel). The device may obtain an indication that indicates the range adjustment models (e.g., first range adjustment model, second range adjustment model, etc.) to use for CDRR. The device may obtain an indication that indicates the range adjustment model in a floating point precision. For example, the device may obtain the CDRR indication (e.g., as described herein). The device may determine reconstructed features based on the CDRR. The device may decode the video, for example, based on the reconstructed features and/or performed CDRR.

Systems, methods, and instrumentalities described herein may involve a decoder. In some examples, the systems, methods, and instrumentalities described herein may involve an encoder. In some examples, the systems, methods, and instrumentalities described herein may involve a signal (e.g., from an encoder and/or received by a decoder). A computer-readable medium may include instructions for causing one or more processors to perform methods described herein. A computer program product may include instructions which, when the program is executed by one or more processors, may cause the one or more processors to carry out the methods described herein.

Split inference and/or collaborative intelligence may be performed. For example, machine vision analytics (e.g., classification, object detection, object tracking, etc.) may be accomplished, for example, with split deep neural networks (DNN). The split DNN may be physically apart from each other but communicating by transmitting intermediate data at a split point.

The amount of video and images consumed by machines may be rapidly increasing, for example, with the rise of machine learning technologies for vision applications (e.g., in domains like intelligent transportations, smart cities, intelligent content management, etc.). Vision tasks may use (e.g., demand) computations (e.g., heavy computations) and may be performed on cloud systems (e.g., rather than the limited devices capturing the source content, which may perform (e.g., requires) the transmitting of the video content). The amount of source data may use performance compression, for example, to fit physical bandwidth and storage capacities (e.g., similar to traditional video transmission pipelines). Machine vision algorithms may not be sensitive to artifacts (e.g., artifacts associated with image and video codecs designed for human consumption), for example, if (e.g., when) applying lossy compression.

Remote analysis (e.g., efficient remote analysis) may be enabled and/or performed. Remote analysis may include compressing source videos, for example, using actions associated with downstream vision tasks, rather than for human vision (e.g., actions optimized for downstream vision tasks, rather than for human vision). A framework (e.g., shown in FIG. 5) may be used. The framework may include a framework associated with Video Coding for Machines.

Figure 5:
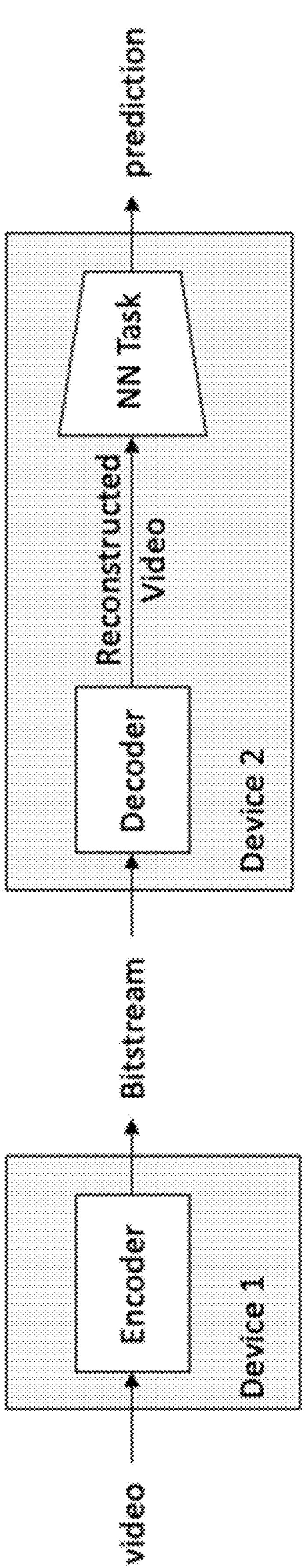
FIG. 5 illustrates an example video coding for machines pipeline.

FIG. 5 illustrates an example video coding for machines pipeline.

The term video may include one or more of image content or video content. The framework, actions, and descriptions provided herein may apply to both (e.g., image and video) types of content.

Figure 6:
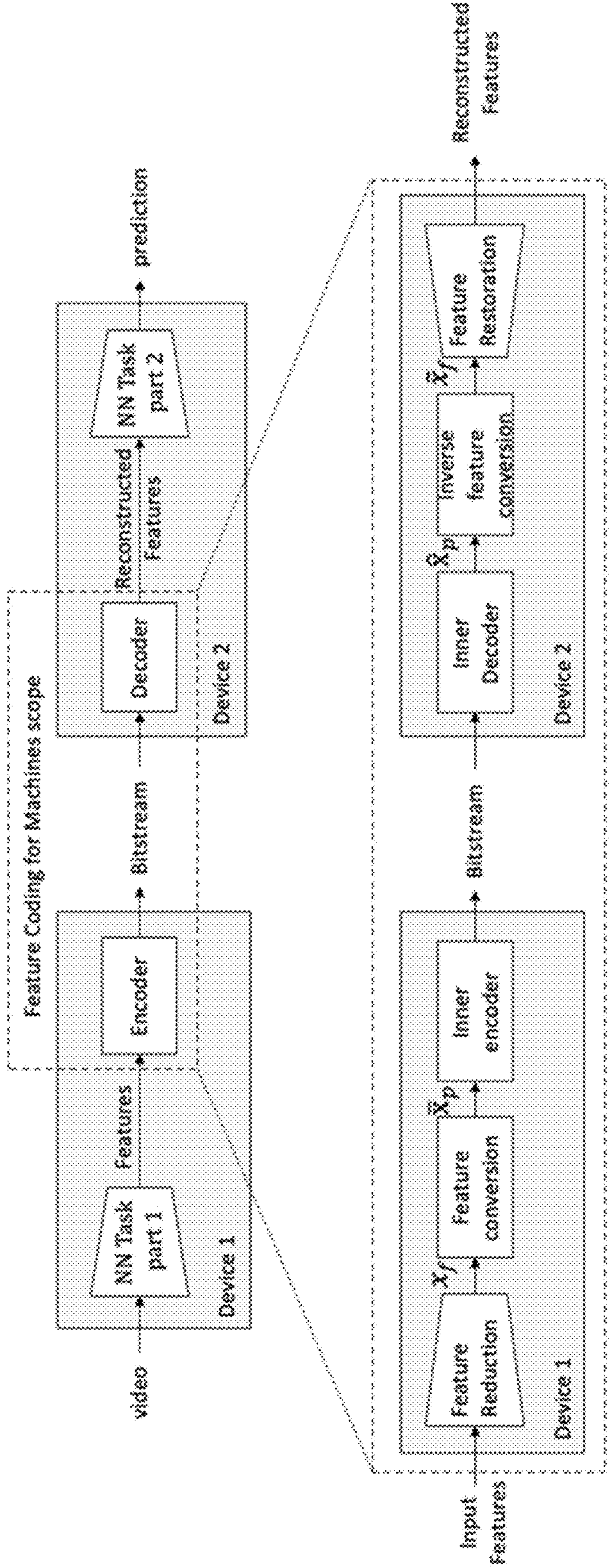
FIG. 6 illustrates an example pipeline feature coding for machines.

FIG. 6 illustrates an example pipeline feature coding for machines. An example framework may include multiple parts (e.g., two parts) of the split DNN mode (e.g., NN Task Part 1 and NN Task Part 2 as shown in FIG. 6). The parts of the split DNN model (e.g., NN Task Part 1 and NN Task Part 2) may be run on different devices, e.g., NN Task Part 1 on a phone or camera and NN Task Part 2 on the network or cloud. Such splitting of the model may be used to offload (e.g., some of the) computations, for example, if (e.g., when) the device that captures or contains the source content is limited in terms of processing, memory, energy, etc. It can also be useful to transmit such features while protecting the privacy of the original content (e.g., because the original pixels are not directly coded). In this context, at the split point, intermediate data or features need to be transmitted to the remote machine to perform the second part of the model inference.

The device containing the source video may perform NN Task Part 1 to extract features. These features may be transmitted and analyzed remotely by NN Task Part 2. The data volume of the feature tensor(s) in 3 dimensions may be (e.g., often) greater (e.g., much greater) than input data volume. The size of bitstream may be reduced before the transmission (e.g., by introducing a codec). Video codes may be optimized for human consumption and may not be efficient to compress the extracted intermediate feature tensors (e.g., extracted intermediate feature tensors with large dimension in 3D array). Compression methods for the intermediate feature tensors may be provided, for example, in the context of split inference scenario.

FIG. 6 (e.g., at the zoomed-in dashed block) shows example compression modules composing a feature coding for machines coding pipeline. Input features may be compressed. Feature coding for machines (FCM) may employ learned shallow neural networks (NNs) (e.g., taking a set of the feature tensors in 3D as input from a split point and outputting a single tensor with much smaller data volume), for example, to compress the input features. The single tensor $x_f$ may be quantized, for example, with uniform scalar and tiled into a frame to feed into the inner codec (e.g., a conventional 2D video codec). The tiled frames $\hat{x}_p$ may be reconstructed from the bitstream (e.g., on the remote server). The tiled frames $\hat{x}_p$ may be inverted to the shape of tensor in 3D, for example, followed by inverse quantization process. A learned shallow NN may take the reconstructed tensor $\tilde{x}_f$ as input, for example, to restore the full size of original feature tensor. The reconstructed feature tensors with original dimension may be input (e.g., come over) to the NN Task Part 2 to accomplish the inference.

It may be assumed that the pre-trained NN-task-part-1 and NN-task-part-2 may not be trained with the entropy constraint of producing compact intermediate feature representation. Computer vision algorithms may be trained to maximize the accuracy (e.g., trained to only maximize accuracy), for example, unlike auto-encoders that may introduce information bottleneck to properly train a network with respect to both reconstruction quality and bitrate. Feature maps (e.g., each feature map) computed through learned computer vision network may contribute to end accuracy (e.g., contribute only to the end accuracy), for example, whatever their coding cost.

Figure 7:
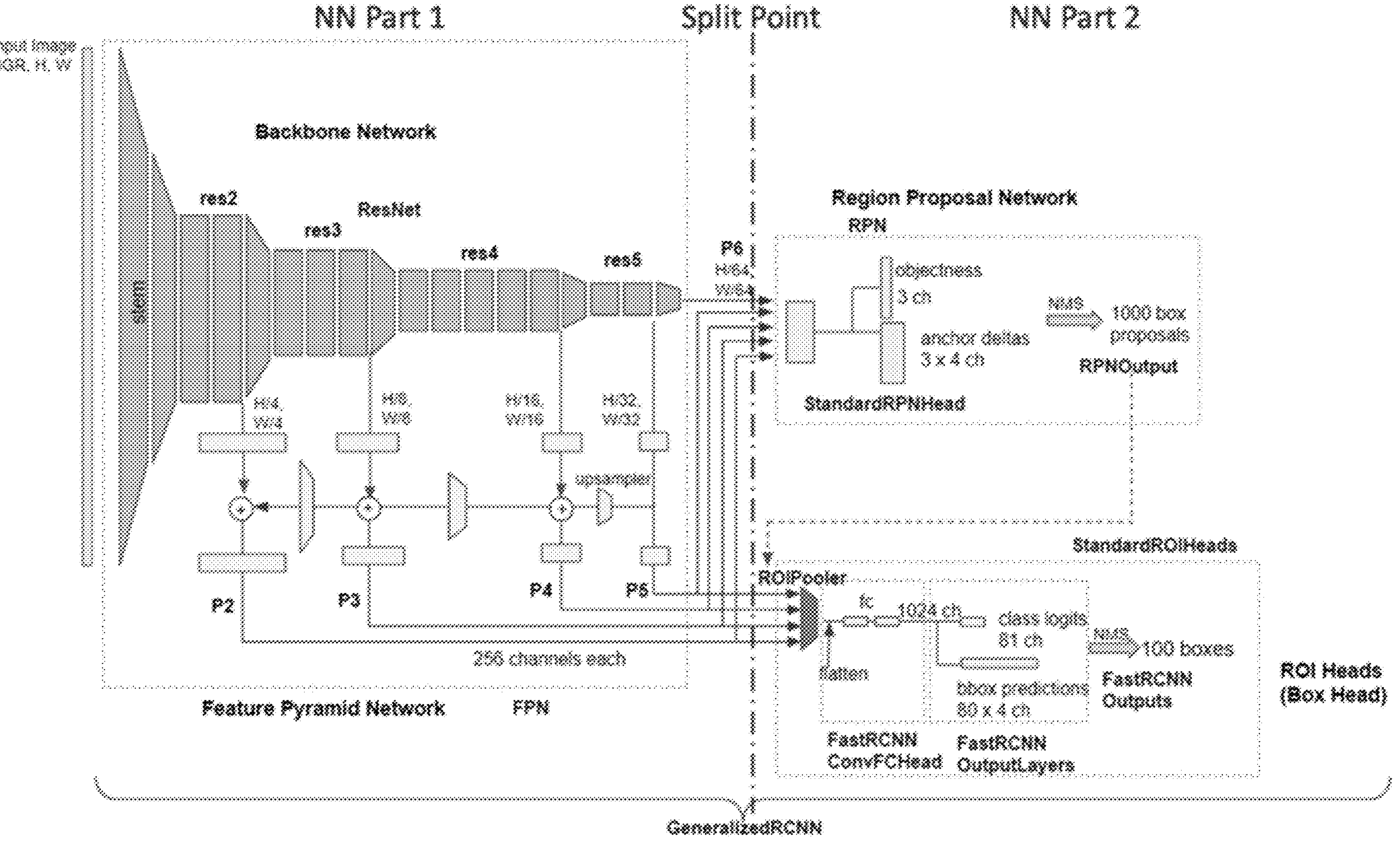
FIG. 7 illustrates an example RCNN architecture.

FIG. 7 illustrates an example regions with convolutional neural network (RCNN) architecture. The P layers may include tensors of 256 channels (e.g., with different resolutions). FIG. 7 may show an example Faster-RCNN architecture. As shown in FIG. 3, the model may include a backbone that may generate feature tensors of different sizes (e.g., P2, P3, P4, P5, P6). The feature tensors (e.g., of different sizes) may be analyzed for tasks, for example, such as object detection and segmentation. In the split-inference context, a split point (e.g., split that separates NN-part-1 and NN-part-2 as shown in FIG. 6) may be considered (e.g., where the encoded and transmitted data corresponds to tensors {P2, P3, P4, P5}).

Figure 8:
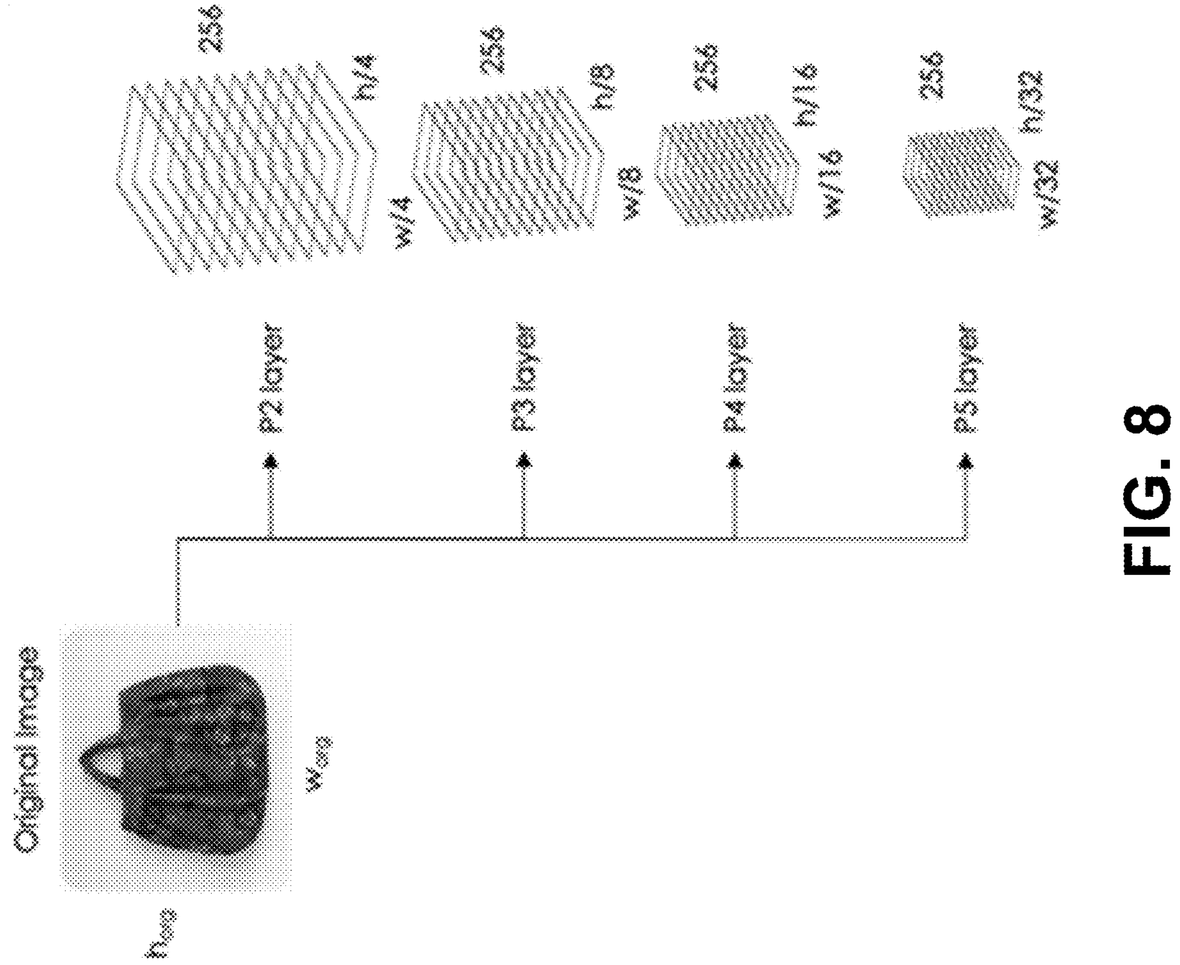
FIG. 8 illustrates example shapes tensors to transmit considering the split point after the backbone network of a generalized regions with convolutional neural network architecture.

FIG. 8 illustrates example shapes tensors to transmit (e.g., considering the split point after the backbone network of a generalized R-CNN architecture). The tensors may include 256 channels for an input image. The tensors may include different resolutions (e.g., depending on the input resolution). The input resolution to the model may be different from the original image (e.g., size $W_{org}\times h_{org}$), for example, due to rescaling and padding operations.

Figure 9:
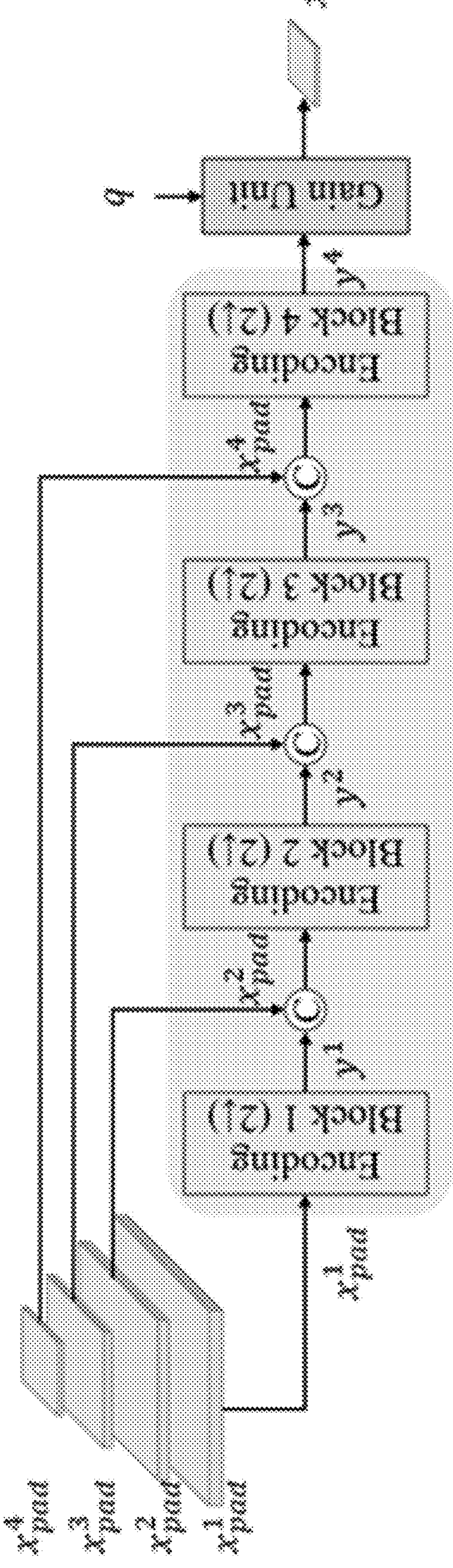
FIG. 9 illustrates an example shallow network architecture for a feature reduction module interfacing with faster regions with convolutional neural network at feature pyramid network outputs.

FIG. 9 illustrates an example shallow network architecture for a feature reduction module interfacing with faster R-CNN at feature pyramid network outputs P2, P3, P4, and P5. Extracted feature tensors out of the NN Part 1 in Faster R-CNN may be fed into a feature reduction model (e.g., as shown in FIG. 9). In examples, P2, P3, P4, P5 may be represented by $$x^1_{pad},\ x^2_{pad},\ x^3_{pad},\ x^4_{pad},$$

respectively. A feature tensor (e.g., each original feature tensor) may be padded (e.g., properly padded) before applying the convolutional layers, for example, because of a spatial shift by nature of the convolution operation.

As shown in FIG. 9, the set of feature tensors may be converted into a single feature tensor (e.g., with 320 channels, $y^4$, for example, using convolutional layers with learned weights). A Gain Unit may adjust the scales of the feature tensor $y^4$, for example, by multiplying each channel by a learned vector (e.g., out of 8 candidate vectors). The gain unit may output the reduced feature tensor $x_f\in\mathbb{R}^{C_f\times H_f\times W_f}$ (e.g., where $C_f$=320 and $H_f\times W_f$ may include the spatial resolution of the feature tensor). The index of the vector (e.g., q) as input to the Gain Unit may be heuristically selected or fixed.

Figure 10:
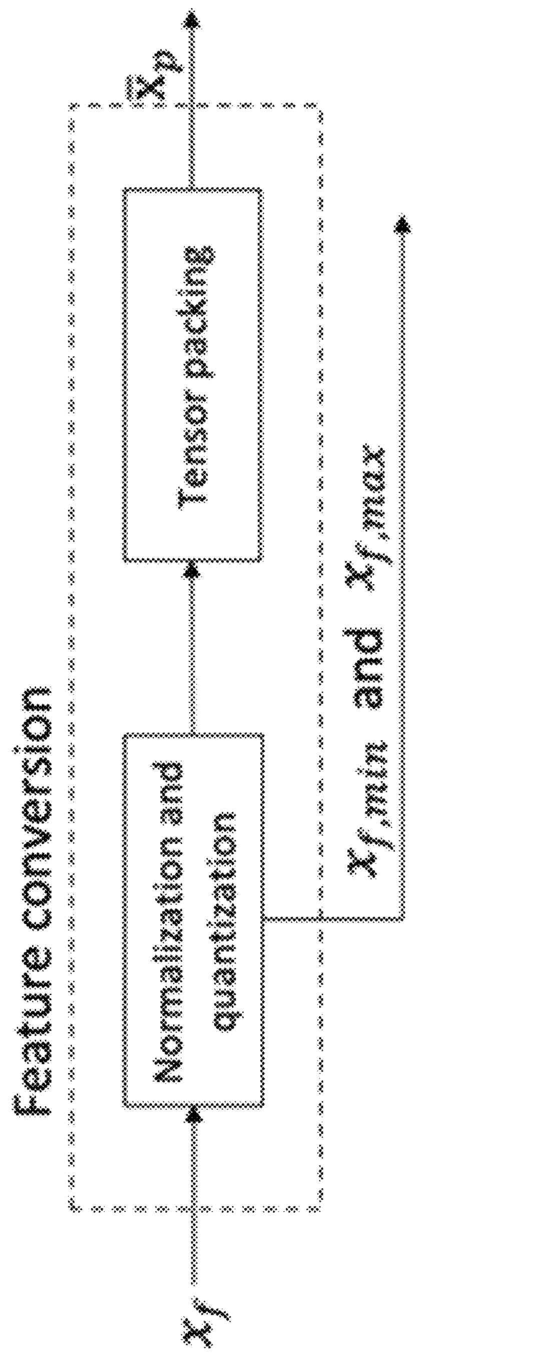
FIG. 10 illustrates an example feature conversion and inverse feature conversion in feature coding for machines.
Figure 10:
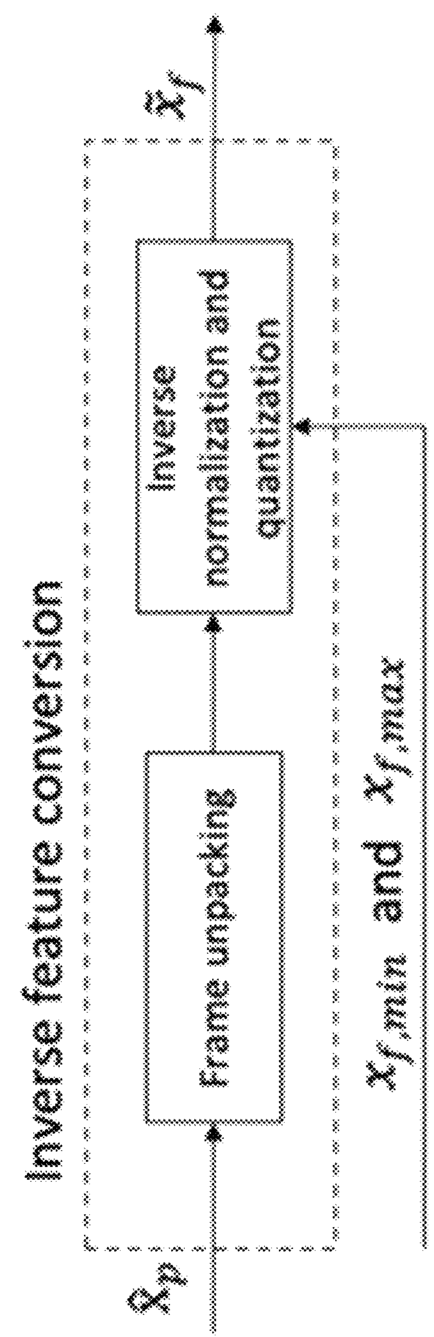

FIG. 10 illustrates an example feature conversion and inverse feature conversion in FCM. A feature conversion module may reshape (e.g., conduct reshaping) 3D tensors into 2D frames (e.g., followed by quantization), for example, to utilize conventional standard video codecs to encode the reduced feature tensor $x_f$ in 3 dimensions. FIG. 10 shows example feature conversion and inverse feature conversion processes in the FCM pipeline. The order between the two modules may be swapped (e.g., tensor packing may be swapped with normalization and quantization in the feature conversion; unpacking may be swapped with inverse normalization and quantization in the inverse feature conversion).

For an input feature tensor $x_f$ (e.g., each input feature tensor) reduced by the reduction module, the minimum and maximum values of the feature tensors, $x_{f,min}$ and $x_{f,max}$ may be extracted and used to normalize the feature values between 0 and 1 according to Eq. 1.

$$x'_f = \max\left(\min\left(\frac{x_f - x_{f,min}}{x_{f,max} - x_{f,min}}, 0\right), 1\right) \quad \text{Eq. 1}$$

Uniform quantization (e.g., n-bit uniform quantization) may be used (e.g., followed), for example, to represent the features in n-bit integer values to code with the associated standard codec, as shown in Eq. 1.

$$\bar{x}_f = \text{round}\left(x'_f \times (2^n - 1)\right) \quad \text{Eq. 2}$$

The rounding operation may include round ( ) for example, which may include a rounding operation to the nearest integer value.

For the spatial feature packing, the frame resolution $H_p$ and $W_p$ may be computed such that the shape of the packed frame become wide rectangular, for example, as much as possible by which $C_f$ is divided properly in width and height and multiplied by $W_f$ and $H_f$, respectively.

Figure 11:
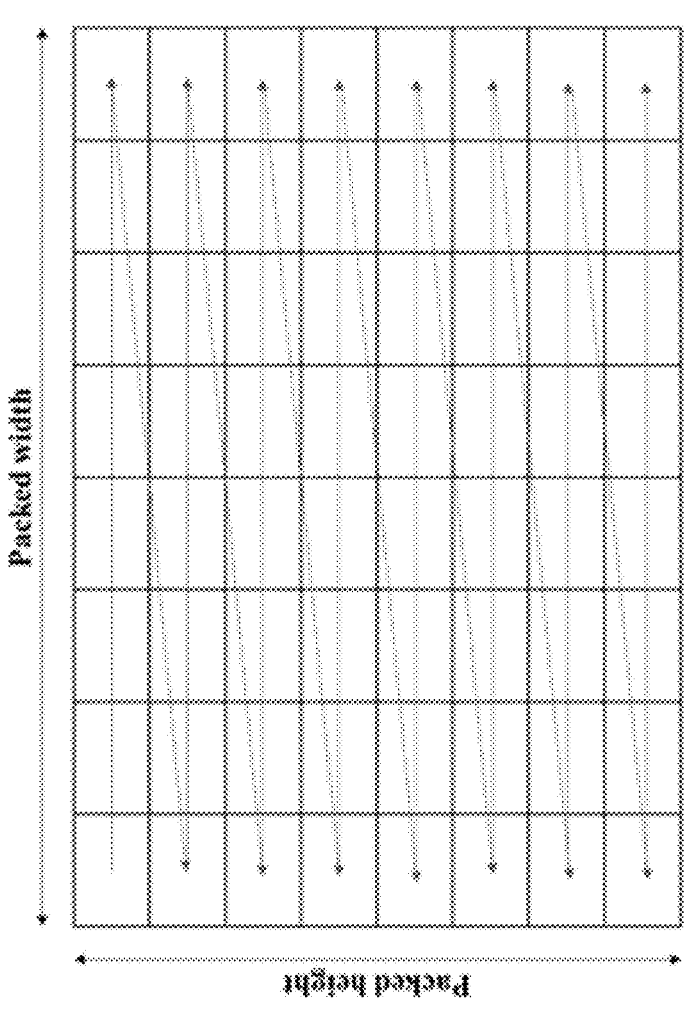
FIG. 11 illustrates an example tiled feature channels into a packed frame.
Figure 11:

FIG. 11 illustrates an example tiled feature channels into a packed frame. As shown in FIG. 11, the final packed frame may include $\bar{x}_p\in\mathbb{R}^{H_p\times W_p}$ out of $C_f$.

The frame $\bar{x}_p$ represented in n-bit integer may be fed into the standard video codec (e.g., after a conversion process). Information (e.g., such as $x_{f,min}$, $x_{f,max}$, feature tensor sizes, etc.) may be coded and added to the bitstream. The decoding process may correspond to the inverse scaling and packing operations of the encoder in inverse order, for example, using the parsed information from the bitstream.

The channel dynamic range of channels of the tensor may be adjusted (e.g., using a range adjustment model). The channel dynamic range of channels of the tensor may be adjusted after the minimum and maximum normalization process using a range adjustment model (e.g., with scale and shift), for example, such that the packed frame $\overline{x}_p$ may be optimized to be coded (e.g., efficiently coded in terms of rate and task accuracy). The computed range adjustment model (e.g., scales and shifts) may be applied to $x'_f$, for example, (e.g., specifically) during the encoding process. Inverse scaling and shifting parameters may be applied to the reconstructed feature tensor, for example, to bring back to the original channel dynamic range (e.g., for the decoding time). In examples, the inverse scale and shift parameters may be coded in video data (e.g., the bitstream) to be adaptive to an input (e.g., each input) $x_f$. In examples, the scales and shifts parameters may be transmitted for frames (e.g., selected frames). The decoding of other frames may use parameters derived from pre-existing ones, for example, if (e.g., when) updates are performed (e.g., not needed). Scale and shift parameters may be coded into the video data (e.g., bitstream). The scale and shift parameters may be coded as integer values and may bring back floating point precision (e.g., at the decoder). A sample realization for optimizing scale and shift parameters may be used. Optimizing scale and shift parameters may incorporate with reduction and restoration actions and/or operations (e.g., algorithms).

Feature reduction and restoration actions in the coding pipeline (e.g., if/when compressing FCM) may have to adapt to interface with (e.g., any) split neural networks (NNs), for example, because there may be a variety (e.g., large variety) of task vision models with (e.g., many) potential split points (e.g., yielding various intermediate feature characteristics: shapes, sizes and distribution of the values). Data dimension reduction and restoration (e.g., efficient data dimension reduction and reduction) on the intermediate feature tensor (s) may be provided. Total data volume of the feature tensors at the split may surpass the size of the original input image. Principal component analysis (PCA)-based methods and NN-based methods may be considered for reduction and restoration. NN-based reduction and restoration models dedicated to a (e.g., each) considered split point and machine vision network may be considered. In this case, $x_f$ may correspond to the activation output of learned layer that may follow Gaussian or Laplacian density functions. With the PCA-based approaches, $x_f$ may become a sparse representation associated with computed basis vectors.

During the conversion process, x may be normalized and quantized to integer values. $x_f$ may be coded (e.g., with standard codecs) that may include prediction, transform and quantization. It may be non-trivial to adapt the input-dependent $x_f$ to the quantization and standard codec algorithm at the reduction stage, for example, such that the statistical characteristics of $x_f$ may be preserved (e.g., while reducing the bitstream size for the rate vs. task accuracy coding performance).

$x_f$ may be updated (e.g., adjusted), using a range adjustment model (e.g., with scale and shift parameters) for a (e.g., each) feature channel, for example, such that the updated $x_f$ can be coded in a smaller bitstream (e.g., by the accompanying inner video codec). The parsed range adjustment model (e.g., scale and shift parameters) for a (e.g., each) channel may (e.g., during decoding) be applied to the reconstructed feature and may bring back the output distribution as close as possible to the original by the inverse affine transformation (e.g., scale and shift) to preserve the end task accuracy.

As shown in FIG. 9, learned NN-based reduction and restoration for different task network and split points may be adopted. The reduction and restoration may include the scaling (e.g., Gain Unit) and inverse scaling computation (e.g., Inverse Gain Unit) on the feature tensor (e.g., at the last part and the first part of the modules, respectively). NN-based Image Compression may be used with multivariate operation. The module in FCM may be used to scale (e.g., properly scale) the feature tensor, for example, so that the size of the bitstream can vary without updating the rest of weights for the convolutional layer. A bitstream size (e.g., actual bitstream size) may be determined over the compression process (e.g., within inner codec). The learned weight in offline manner may limit the gain unit to adapt to the input-dependent feature tensor $x_f$.

Range adjustment (e.g., Scale and shift operations) may be introduced to (e.g., applied by) both encoder and decoder. The range adjustment (e.g., scale and shift parameters) at the encoder may be optimized towards compression efficiency (e.g., from the inner codec perspective). The range adjustment (e.g., scale and shift parameters) at the decoder can be optimized (e.g., separately optimized) for feature reconstruction from task accuracy perspective. The range adjustment model(s) (e.g., scale and shift parameters) may be derived (e.g., through various optimization algorithms during encoding). The range adjustment model(s) (e.g., scale and shift parameters) may be channel-based (e.g., per-channel, such as a first scale parameter and a first shift parameter may be associated with a first channel associated with a tensor, and a second scale parameter and a second shift parameter may be associated with a second channel associated with the tensor). The distribution of the input $x_f$ may be adapted (e.g., based on range adjustment (e.g., derived scale and shift parameters)). Values (e.g., pre-existing values) can be selected and used at the decoder side (e.g., to reduce the overhead bits for transmitting the optimized scale and shift), for example, by signaling an indication (e.g., flag) or mode (e.g., if needed).

Figure 12:
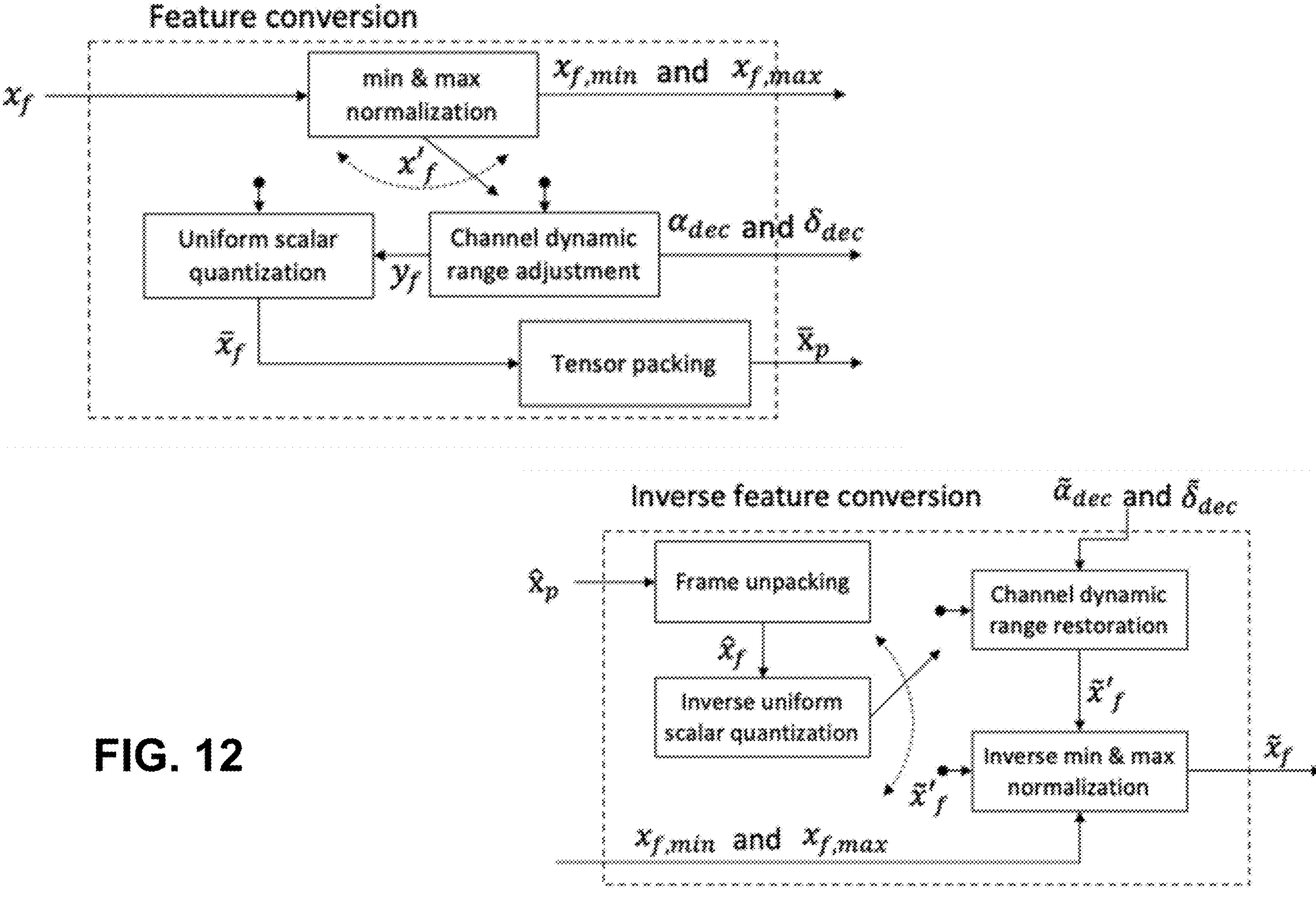
FIG. 12 illustrates an example of conversion with the channel dynamic range adjustment and restoration in an encoder and decoder, respectively.

Channel dynamic range adjustment may be performed. FIG. 12 illustrates an example of conversion with the channel dynamic range adjustment and restoration in an encoder and decoder, respectively.

FIG. 12 shows an example of conversion which may include a channel dynamic range adjustment (CDRA) (e.g., for the encoder) and channel dynamic range restoration (CDRR) (e.g., for the decoder). The output of the feature reduction $x_f$ (e.g. obtained feature tensor associated with feature reduction) may undergo normalization, for example, using its minimum $x_{f,min}$ and maximum $x_{f,\,max}$ values (e.g., which may be extracted and coded into the video data (e.g., bitstream) for inverse decoding operations). CDRA may be determined to be used, for example, on the feature tensor (e.g., normalized feature tensor). CDRA may include using a range adjustment model (e.g., a first range adjustment model for a first channel associated with the feature tensor and a second range adjustment model for a second channel associated with the feature tensor). CDRA may include using scale parameter(s) and/or shift parameter(s). For example, a first range adjustment model may be associated with using a first scale parameter and a first shift parameter (e.g., that are associated with the first channel), and a second range adjustment model may be associated with using a second scale parameter and a second shift parameter (e.g., that are associated with the second channel). The range adjustment models may be channel-level (e.g., each range adjustment model may be associated with a respective channel). The normalized feature tensor $x'_f$ may be used (e.g., selectively used) as an input to the uniform scalar quantization or to the proposed CDRA. In the CDRA, a channel (e.g., each channel) of $x'_f$ may be range adjusted (e.g., scaled and shifted) according to Eq. 3.

$$y^i_f = \alpha^i_{enc} \times x'^i_f + \delta^i_{enc} \qquad \text{Eq. 3}$$

Scale parameters may include $$\alpha^i_{enc}$$

and shift parameters may include $$\delta^i_{enc}$$

for the channel i=1, 2, . . . , $C_f$, for example, such that the boundary feature values between neighboring channels within the tensor packed frame $\overline{x}_p$ may become continuous (e.g., to be easier spatially predicted within the inner codec). The scale and/or shift parameters may be determined based on a model. The model may be a channel-level model (e.g., a model per channel). For example, a first scale parameter and a first shift parameter may be determined using a first model associated with the first channel, and a second scale parameter and a second shift parameter may be determined using a second model associated with the second channel. The model may be trained. The model may be a linear model, a logarithmic model, and/or the like. In examples, a trained model may be associated with the channels (e.g., all the channels). A trained model (e.g., associated with all the channels) may be used to determine the scale and shift parameters associated with the channels (e.g., scale and shift parameters associated with all the channels). In the normalization process, although the minimum value of the input $y_{f,min}$. The tensor packed frame (e.g., determined based on the performed CDRA) may be sent (e.g., in video data, via a bitstream). An indication may be included in video data (e.g., via a bitstream) to indicate whether CDRA was used on the tensor packed frame. The indication may be a CDRR indication. The CDRR indication may indicate how to apply CDRA/CDRR on the tensor packed frame. The video may be encoded, for example, based on the performed CDRA.

The output of the inner codec $\hat{x}_p$ (e.g., at the decoder side) may be fed into the unpacking process to rearrange the input (e.g., in a 3 dimensional tensor shape). Unpacked feature tensor $\hat{x}_f$ may be divided by $(2^n-1)$, for example, corresponding to the inverse uniform quantization stage. The output of the inverse quantization may be used (e.g., directly used) as an input to the inverse minimum and maximum normalization, for example, if there is an indication (e.g., flag) indicating that CDRA (e.g., at the encoder) is not used (e.g., CDRR is disabled at the decoder). The output of the inverse quantization may be used as an input to the CDRR (e.g., followed by the inverse minimum and maximum normalization as shown in FIG. 12 with respect to inverse feature conversion), for example, if the signal indicates that CDRR (e.g., at the decoder side) is enabled (e.g., CDRA was used at the encoder side). With the CDRR, $\tilde{x}'_f$ may be updated by $$\tilde{x}'^i_f \leftarrow \frac{\left(\tilde{x}'^i_f - \tilde{\delta}^i_{dec}\right)}{\tilde{\alpha}^i_{dec}} \qquad \text{Eq. 4}$$

Depending on what to optimize the scale and shift parameters for, the same scale and shift parameters may be used in both encoder and decoder (e.g., $\alpha_{enc}=\delta_{dec}$ and $\delta_{enc}=\delta_{dec}$) or different parameters (e.g., $\alpha_{enc}\neq\alpha_{dec}$ and $\delta_{enc}\neq\delta_{dec}$) may be used. In either case, the range adjustment model(s) (e.g., scale and the shift parameters for the decoder $\alpha_{dec}$ and $\delta_{dec}$) may be coded in video data (e.g., the bitstream). The video may be encoded, for example, based on the performed CDRA (e.g., based on an adjusted feature tensor).

It may be assumed that scale and shift parameters $\acute{\alpha}_{dec}$ and $\acute{\delta}_{dec}$ may be known (e.g., pre-configured or previously decoded) at the decoder side. Based on the assumption, an indication may be signaled to use those known (e.g., pre-configured or previously decoded) parameters instead of parsing a different (e.g., new) $\tilde{\alpha}_{dec}$ and $\tilde{\delta}_{dec}$ from a bitstream for the CDRR computation.

For video input, $\alpha_{dec}$ and $\delta_{dec}$ maybe periodically refreshed (e.g., every L frames), for example, which may reduce the overhead bits to code $\alpha_{dec}$ and $\delta_{dec}$ for every frame. For example, $\tilde{x}'_{f,t}$ may be the decoded feature tensor at time t by which the CDRR is applied to $\tilde{x}'_{f,t}$ with $\tilde{\alpha}_{dec,t}$ and $\tilde{\delta}_{dec,t}$ to update it. When decoding the next frame at time t+n, by referencing the scale and shift of the previous feature tensor, x ˜'_(f,t+1) can be updated according to Eq. 5 (e.g., where n=1, 2, . . . . L−1).

$$\tilde{x}'^i_{f,t+n} \leftarrow \frac{\left(\tilde{x}'^i_{f,t+n} - \tilde{\delta}^i_{dec,t}\right)}{\tilde{\alpha}^i_{dec,t}} \qquad \text{Eq. 5}$$

Reconstructed features may be determined, for example, based on CDRR performed on an unpacked feature tensor. The reconstructed features may be used for a decoding operation. The video may be decoded, for example, based on the performed CDRR (e.g., reconstructed features).

Changes between normalization and CDRA may be provided herein.

Figure 13:
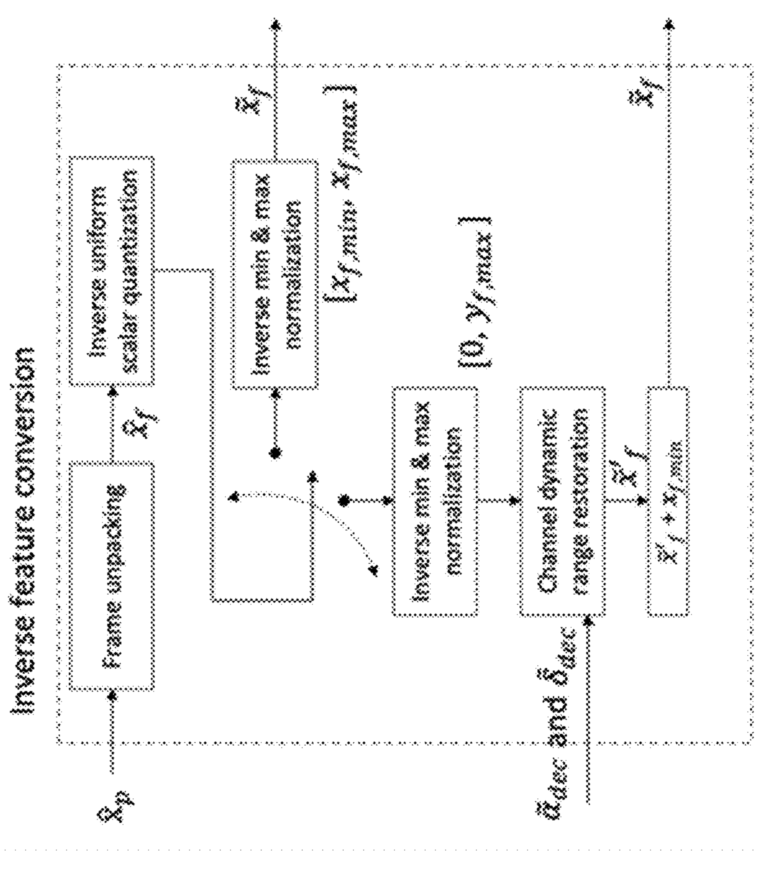
FIG. 13 illustrates an example of conversion using channel dynamic range adjustment and restoration in an encoder and decoder, respectively.
Figure 13:
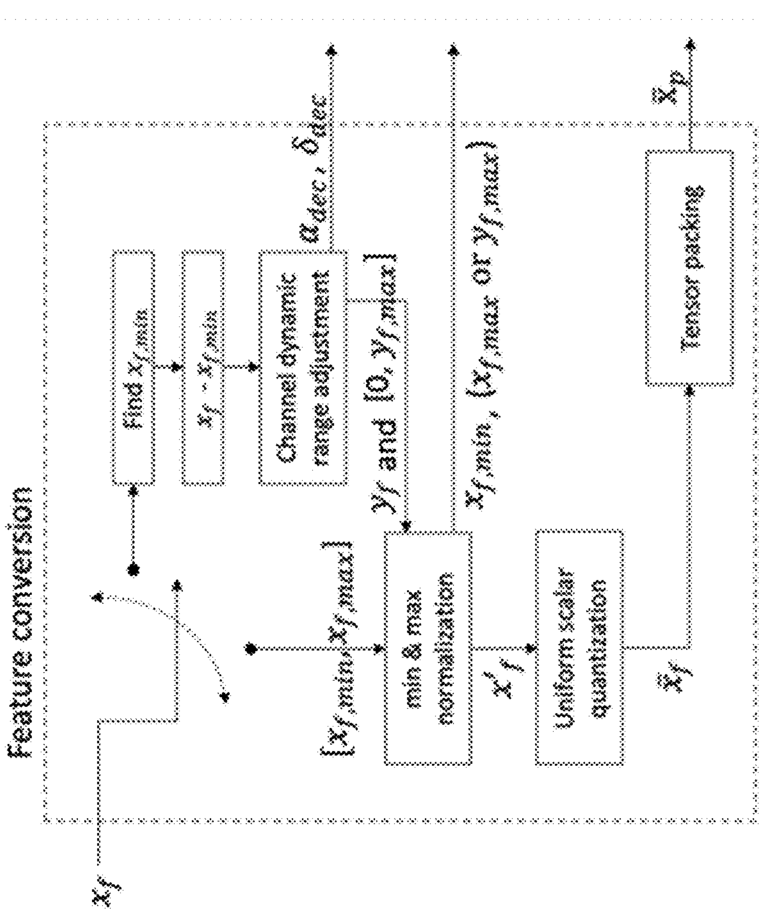

The minimum and maximum normalization processes may be performed using different minimum and maximum values, for example, depending on use of the proposed channel dynamic range adjustment (e.g., as shown in FIG. 13).

FIG. 13 illustrates an example of conversion using channel dynamic range adjustment and restoration in an encoder and decoder, respectively.

As shown in FIG. 13 (e.g., with respect to feature conversion), normalization may include normalizing $x_f$ with its own minimum and maximum values, $[_{f,min}, x_{f,max}]$, for example, if CDRA is not enabled. The $x_{f,min}$ and $x_{f,max}$ may be coded in video data (e.g., in the bitstream). $x_{f,max}$ may proceed (e.g., as input) to the uniform scalable quantization followed by the tensor packing.

The input to CDRA may be $x_f-x_{f,min}$ (e.g., such that the minimum value of the input may be 0), for example, if (e.g., when) the CDRA is used. CDRA itself may be similar (e.g., identical) to the actions described herein (e.g., with respect to FIG. 12), for example, in which the scale a and shift δ parameters may optimized for compression efficiency in terms of rate vs. distortion (e.g., MSE between $x_f$ and $\tilde{x}_f$ for task accuracy) by adjusting the channel dynamic ranges. An output of the CDRA (e.g., $y_f$) may be in the range of $[0, y_{f,max}]$. $y_f$ may be normalized to compute $x'_f$, for example, with the boundary range of $[0, y_{f,max}]$. The $x_{f,min}$ and $y_{f,max}$ may be coded in the video data (e.g., bitstream), for example, for the corresponding decoding process.

The output of the inner codec $\hat{x}_p$ (e.g., at the decoder side) may be fed into the unpacking process, for example, to rearrange the input in a 3 dimensional tensor shape. The unpacked feature tensor $\hat{x}_f$ may be divided by $(2^n-1)$, for example, corresponding to the inverse uniform quantization stage. The output of the inverse quantization may be used (e.g., directly used) as an input to the inverse minimum and maximum normalization with parsed $x_{f,min}$ and $x_{f,max}$, for example, if there is an indication (e.g., flag) indicating that CDRA is not used (e.g., at the encoder). The output of the inverse quantization may be used as input to the minimum and maximum normalization (e.g., with the minimum value 0 and parsed maximum value $y_{f,max}$ from the bitstream), for example, if the signal indicates that that CDRR is enabled (e.g., at the decoder side). The output of the inverse normalization $\tilde{x}'_f$ may be fed into the CDRR as input. With the CDRR, $\tilde{x}'_f$ may be updated according to Eq. 6.

$$\tilde{x}_f'^i \leftarrow \frac{\left(\tilde{x}_f'^i - \tilde{\delta}_{dec}^i\right)}{\tilde{\alpha}_{dec}^i} \quad \text{Eq. 6}$$

Details associated with the scale and parameters may be provided herein (e.g., with respect to CDRA and CDRR). The output $\tilde{x}_f$ may be computed by adding parsed $x_{f,min}$ to the updated $\tilde{x}'_f$. Mode signaling may be performed and/or described herein. The mode may be signaled (e.g., via a CDRR indication). Scaling and shifting (e.g., via CDRA or CDRR as described herein) may be enabled or indicated (e.g., determined) to be bypassed. In examples, different modes (e.g., indicating whether scaling and/or shifting is enabled or bypassed) may be signaled, for example, using bits (e.g., 2 bits). An example of signaling different modes (e.g., four different modes) via bits is shown in Table 1.

TABLE 1

Specification of operational behaviors with the channel dynamic range restoration.

| Mode | bits | Operations with the channel dynamic range restoration |
|---|---|---|
| 0 | 00 | Bypass the channel dynamic range restoration |
| 1 | 01 | Parsing $\alpha_{dec}$ and $\delta_{dec}$ are expected and use them for the computation. |
| 2 | 10 | No parsing $\alpha_{dec}$ and $\delta_{dec}$, but refercen the previously decoded scale and shift parameters. |
| 3 | 11 | No parsing $\alpha_{dec}$ and $\delta_{dec}$, but reference pre-existing scale and shift parameters. |

The mode and operation behavior mapping or the assigned bits and operation behaviors in Table 1 may vary. For example, parameters (e.g., $\acute{\alpha}_{dec}$ and $\acute{\delta}_{dec}$) may be transferred ahead of time to the decode side, for example, through a separate transmission period. In examples (e.g., with respect to Table 1), if the mode is equal to 3, the pre-existing scale $\acute{\alpha}_{dec}$ and shift $\tilde{\delta}_{dec}$ parameters in the decoder may be indicated (e.g., to be used). Those parameters may be present at the decoder, for example, as they may be transferred offline (e.g., while establishing remote connection between sender and receiver at the application or system level) or the initial parameters may be fixed (e.g., by default) by following a standard specification if adopted.

Scale and shift parameters may be coded.

Scale and shift parameters (e.g., proper scale and shift parameters) may be determined, for example, while performing optimization. The scale and/or shift parameters may be determined using a model (e.g., channel-level model, linear model, logarithmic model, etc.). A (e.g., each) value $$\delta_{dec}^i$$

and $$\alpha_{dec}^i$$

may be expressed in floating point precision (e.g., over the optimization process to determine scale and shift parameters). A value (e.g., each value) may be coded in 64-bit or 32-bit floating precision. The value (e.g., each value) may be coded (e.g., efficiently coded), for example, to reduce the overhead. For example, large symbols may be assigned to code the parameters in floating point precision. The value (e.g., each value) may be coded in video data (e.g., the bitstreams) according to the following.

The value may be scaled up by $P=2^k$ where k may include the number of bits to code the value (e.g., and be rounded to the nearest integer), for example, if (e.g., when) the scale $$\alpha_{dec}^i$$

is a positive value (e.g., as shown in Eq. 7).

$$\bar{\alpha}_{dec}^i = \text{round}\left(\alpha_{dec}^i \times P\right) \quad \text{Eq. 7}$$

The approximation of $$\alpha_{dec}^i$$

may be computed as $$\frac{\bar{\alpha}_{dec}^i}{P},$$

for example, after parsing the coded scale with k bit (e.g., at the decoder side).

The number of bits (e.g., k) may be coded by subtracting the minimum support precision (e.g., 10-bit). For example, if k is equal to 13, the difference 3 (e.g., =13-10) may be coded in video data (e.g., in the bitstream). At the decoder, the difference 3 may be parsed from bitstream and added to 10 to get 13 bits precision.

Precision may be represented (e.g., indicated) in mode values associated with a mapping table (e.g., as shown in Table 2), for example, instead of coding the difference from the minimum support precision. Arbitrary values may be used (e.g., possible to use) as the precision (e.g., as listed in Table 2), and may be shared with the decoder to refer to.

TABLE 2

| An example precision table. | |
|---|---|
| Mode | Precision, P |
| 0 | $10^1$ |
| 1 | $10^3$ |
| 2 | $10^5$ |
| . . . | . . . |

In examples, a precision (e.g., $10^3$) may be applied to the scale parameters (e.g., in both encoder and decoder), for example, by default without an indication (e.g., with no signal), for example, if specified (e.g., configured).

In examples, the shift parameter $$\delta^i_{dec}$$

may include a positive value. The shift $$\delta^i_{dec}$$

may be scaled and rounded to the nearest integer (e.g., similar to the way to code $$\alpha^i_{dec}$$

according to Eq. 8.

$$\bar{\delta}^i_{dec} = \text{round}\left(\delta^i_{dec} \times P\right) \quad \text{Eq. 8}$$

P may (e.g., as described herein) be presented by $2^k$ so the k is coded in bitstream. P may be derived by a coded mode (e.g., as shown in Table 2). A precision may be used by default (e.g., in both encoder and decoder). Therefore, $$\delta^i_{dec}$$

may be computed by $$\frac{\bar{\delta}^i_{dec}}{P}$$

(e.g., in the decoder).

In examples, P may be signaled differently for $$\alpha_{dec}$$

and $$\delta_{dec}$$

The same P may be applied to both scale and shift parameters. Signaling (e.g., via video data or the bitstream) may be skipped, for example, if the precision is inferred (e.g., in the encoder and decoder).

In examples, if (e.g., when) the shift parameter $$\delta^i_{dec}$$

is negative, the absolute value of $$\delta^i_{dec}$$

may be scaled and rounded according to Eq. 9.

$$\bar{\delta}^i_{dec} = \text{round}\left(\left|\delta^i_{dec}\right| \times P\right) \quad \text{Eq. 9}$$

Separately, the sign bit, $s^i$ may be derived according to Eq. 10 and coded.

$$s^i = \begin{cases} 0, & \text{when } \delta^i_{dec} \geq 0 \\ 1, & \text{when } \delta^i_{dec} < 0 \end{cases} \quad \text{Eq. 10}$$

At the decoder side with the parsed sign bit $s^i$ from the bitstream, $$\delta^i_{dec}$$

can be computed according to Eq. 11.

$$\delta^i_{dec} = \begin{cases} 1 \times \frac{\bar{\delta}^i_{dec}}{P}, & \text{when } s^i = 0 \\ -1 \times \frac{\bar{\delta}^i_{dec}}{P}, & \text{when } s^i = 1 \end{cases} \quad \text{Eq. 11}$$

In examples, the sign bit may be coded. For example, the sign bit may be coded replacing the least significant bit of $$\bar{\delta}^i_{dec}$$

(e.g., the least significant bit is replaced by the sign bit). In this case, coded integer value of $$\bar{\delta}^i_{dec}$$

may be (e.g., always) even, and the precision loss may be insignificant after rescaling to the floating point precision. For example (e.g., at the decoder), the sign part at the least significant bit may be extracted from the coded integer value of the shift parameter (e.g., replacing the least significant bit with zero (0)). The updated $\bar{\delta}^i_{dec}$ may be computed according to Eq. 12.

$$\bar{\delta}^i_{dec} \leftarrow ((|\delta^i_{dec}| >> 1) << 1) + s^i \quad \text{Eq. 12}$$

At the decoder side, the sign bit can be derived according to Eq. 13.

$$s^i = \bar{\delta}^i_{dec} \,\&\, 1 \quad \text{Eq. 13}$$

where & may represent the bitwise logical and operation. The shift parameter may be updated according to Eq. 14.

$$\bar{\delta}^i_{dec} \leftarrow \delta^i_{dec} - s^i \quad \text{Eq. 14}$$

Scale and shift parameters may be optimized, for example, at the encoder.

An output of the feature reduction may include $x_f \in \mathbb{R}^{C_f \times H_f \times W_f}$, for example, where $C_f$=320 and $H_f \times W_f$ represents the spatial resolution of the feature tensor. In this case, the length of the scale and shift parameters may the same as $C_f$. Eq. 15 illustrates example sets of scale and shift parameters.

$$\alpha_l = \{\alpha_l^1, \alpha_l^2, \ldots, \alpha_l^{C_f}\} \text{ and } \delta_l = \{\delta_l^1, \delta_l^2, \ldots, \delta_l^{C_f}\}, \text{ where } l = \{enc, dec\}. \quad \text{Eq. 15}$$

Optimal $\alpha_l$ and $\delta_l$ may be determined. For example, optimal $\alpha_l$ and $\delta_l$ may be determined using a learning process. The learning process may be performed during encoding (e.g., online learning) or offline.

Gradient computations that update (e.g., properly update) a variable by derivative calculation may be important (e.g., using a learning method), for example, where a (e.g., each) scale and shift parameter can be defined with activation functions according to Eq. 16.

$$\alpha_l^i = relu(\tanh(v_l^i)) \text{ and } \delta_l^i = relu(\tanh(w_l^i)) \quad \text{Eq. 16}$$

where v and w may include the learnable variables for α and δ, respectively. α and δ may be bounded (0, 1], for example, based on the activation functions: relu( ) and tan h( ).

A negative value for δ may be allowed. A negative value for δ may be determined according to Eq. 17.

$$\delta_l^i = \tanh(w_l^i) \quad \text{Eq. 17}$$

In examples, the scale parameter may include the output of a logarithmic function, for example, as shown by Eq. 18.

$$\alpha_l^i = \log_2(1.0 + eps + relu(\tanh(v_l^i))) \quad \text{Eq. 18}$$

where eps may include a small epsilon number (e.g., 0.00001), for example, to prevent dividing the feature tensor by 0.

With defined (e.g., properly defined) α and δ using learnable variables (e.g., as described herein), $\bar{x}_p$ may be computed (e.g., as described herein, with respect to FIG. 12.

The learning graph may be designed, for example, without differentiable inner codec such that $\bar{x}_p$ may become equal to $\hat{x}_p$.

In examples, a differentiable inner codec proxy may be used to simulate compression noise onto $\hat{x}_p$, where, for example, then $\bar{x}_p$ may become not equal to $\hat{x}_p$ and $\hat{x}_p$ may include compression noise (e.g., such as quantization error, blocking artifacts, etc.).

$\hat{x}_p$ may be used as an input to the inverse feature conversion (e.g., as shown in FIG. 12 with respect to inverse feature conversion). $\tilde{x}_f$ may be computed, for example, using a range adjustment model (e.g., scale and shift parameters) in the processing pipeline. $\tilde{x}_f$ may be computed, for example, based on enabling channel dynamic range restoration, e.g., to train the range adjustment model(s) (e.g., scale and/or shift parameters) for the decoder. The output of the inverse uniform scalar quantization may be used as input for the channel dynamic range restoration associated with the range adjustment model (e.g., scale and/or shift parameters). The output associated with the CDRR may be used as input to inverse minimum and maximum normalization.

A loss function with multiple terms may be defined, for example, to differentiate the learning graph and/or update the variables from the multiple perspectives. The learnable variables may be differentiated with respect to each term. The computed gradients may update variables such that each term may be minimized over the learning iterations.

A loss term may be determined, for example, using the mean squared error (mse) between $x_f$ and $\tilde{x}_f$ (e.g., as shown in Eq. 19).

$$\mathcal{L}_{mse} = \frac{1}{C_f \times H_f \times W_f} \times \sum (x_f - \tilde{x}_f)^2 \quad \text{Eq. 19}$$

Figure 14:
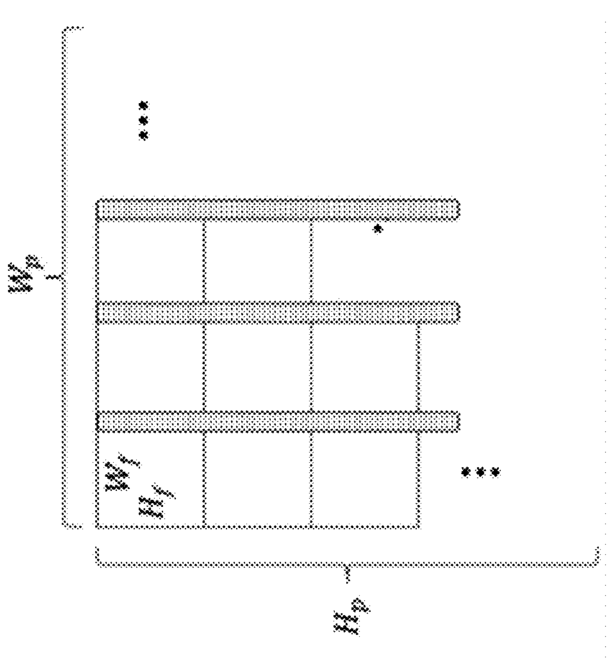
FIG. 14 illustrates an example boundary loss term on a packed frame $\bar{x}_p$.
Figure 14:
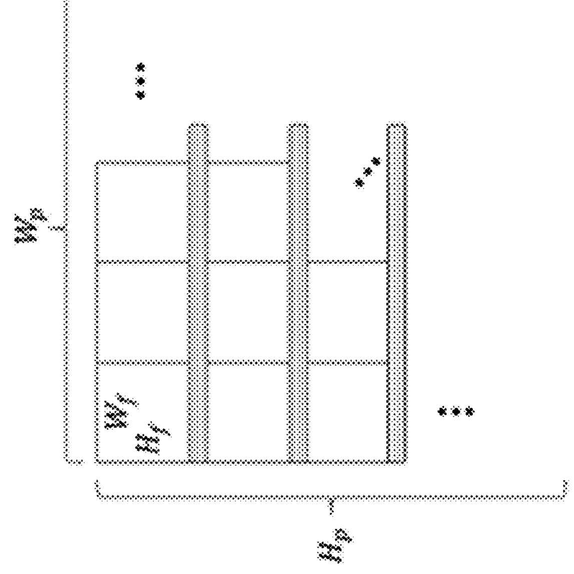

A boundary (bnd) loss term may be determined, for example, to minimize the differences between the border samples of neighboring channels in the packed frame $\bar{x}_p$ (e.g., as shown in Eq. 20).

$$\mathcal{L}_{bnd} = \mathcal{L}_{ver} + \mathcal{L}_{hor} \quad \text{Eq. 20}$$

where $\mathcal{L}_{ver}$ and $\mathcal{L}_{hor}$ may include the sum of absolute feature value difference between up-and-down neighboring channels (e.g., vertically) and side-by-side neighboring channels (e.g., horizontal) along the respective boundary as shown in FIG. 14.

FIG. 14 illustrates an example boundary loss term on a packed frame $\bar{x}_p$. As shown in FIG. 14, a vertical boundary error may be computed. As shown in FIG. 14, a horizontal boundary error may be computed.

Statistical characteristics-based loss function may be determined, for example, with various moments. For example, a first moment (e.g., between mean of $x_f$ and $\tilde{x}_f$) may be determined according to Eq. 21.

$$\mathcal{L}_{mean} = |x_{f,mean} - \tilde{x}_{f,mean}| \quad \text{Eq. 21}$$

The second moment (e.g., between variance of $x_f$ and $\tilde{x}_f$) may be determined according to Eq. 22.

$$\mathcal{L}_{var} = |x_{f,var} - \tilde{x}_{f,var}| \quad \text{Eq. 22}$$

Other moments (e.g., such as skewness) may be defined. Other moments may be used as a loss function.

A loss function (e.g., final loss function) may be formed according to Eq. 24.

$$\mathcal{L} = \gamma_{mse} \times \mathcal{L}_{mse} + \gamma_{bnd} \times \mathcal{L}_{bnd} + \gamma_{mean} \times \mathcal{L}_{mean} + \gamma_{var} \times \mathcal{L}_{var} \quad \text{Eq. 24}$$

where $\gamma_m$, m={mse, bnd, mean, var} may include a weighting scale for a corresponding loss term.

Ecosystems involving the transmission of data for machine vision consumption may apply the features described herein. Techniques and/or details described herein may be applied to the compression of intermediate data in split-DNN model pipelines (e.g., where the split-DNN model trained for machine vision tasks, but it could be useful to code any type of intermediate data from various learned models including Vision, Natural Language Processing, and Multi-modal processing).

Channel dynamic range adjustment (e.g., in an encoder) and channel dynamic range restoration (e.g., in a decoder) may be applied. The use of the channel dynamic range adjustment may be indicated (e.g., by a flag or mode in bitstream), for example, so that the channel dynamic range restoration (e.g., in the decoder) may be enabled. The scale and shift parameters may be parsed from the video data (e.g., bitstream), for example, if needed. An indication (e.g., flag or mode from bitstream) may indicate (e.g., represent) that the scale and shift parameters are coded (e.g., in the bitstream) or indicate to use stored/configured scale and shift parameters. The flag, modes, and/or scale and shift parameters may be coded.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A video encoding device, the video encoding device comprising:

a processor configured to:

obtain a feature tensor associated with a video;

perform a channel dynamic range adjustment, wherein the channel dynamic range adjustment comprises applying a first learned affine range adjustment model to a first channel associated with the feature tensor and applying a second learned affine range adjustment model to a second channel associated with the feature tensor, and wherein an adjusted feature tensor is determined based on the performed channel dynamic range adjustment; and encode the video based on the adjusted feature tensor.

2. The video encoding device of claim 1, wherein the first range adjustment model is associated with a first scale parameter and a first shift parameter, wherein the second range adjustment model is associated with a second scale parameter and a second shift parameter.

3. The video encoding device of claim 2, wherein first scale parameter and the first shift parameter are determined using the first learned affine range adjustment model associated with the first channel, and wherein the second scale parameter and the second shift parameter are determined using the second learned affine range adjustment model associated with the second channel.

4. The video encoding device of claim 1, wherein the feature tensor is a normalized feature tensor, wherein the normalized feature tensor is obtained based on a minimum value and a maximum value associated with the feature tensor, and wherein based on a determination to use channel dynamic range adjustment on the feature tensor, the minimum value is zero.

5. The video encoding device of claim 1, wherein processor is further configured to send a channel dynamic range adjustment indication, wherein the channel dynamic range adjustment indication indicates to bypass channel dynamic range restoration associated with encoded adjusted feature tensor.

6. The video encoding device of claim 1, wherein processor is further configured to send a channel dynamic range adjustment indication, wherein the channel dynamic range adjustment indication indicates to use at least one of the first learned affine range adjustment model or the second learned affine range adjustment model on the encoded adjusted feature tensor.

7. The video encoding device of claim 1, wherein processor is further configured to send a channel dynamic range adjustment indication, wherein the channel dynamic range adjustment indication indicates to use at least one of a third learned affine range adjustment model or a fourth learned affine range adjustment model on the encoded adjusted feature tensor, wherein the third learned affine range adjustment model is a previously decoded range adjustment model, and wherein the fourth learned affine range adjustment model is a previously decoded range adjustment model.

8. The video encoding device of claim 1, wherein processor is further configured to send a channel dynamic range adjustment indication, wherein the channel dynamic range adjustment indication indicates to use a pre-configured range adjustment model on the encoded adjusted feature tensor.

9. The video encoding device of claim 1, wherein processor is further configured to send a channel dynamic range adjustment indication, wherein the channel dynamic range adjustment indication indicates the first learned affine range adjustment model and the second learned affine range adjustment model, and wherein the first learned affine range adjustment model and second learned affine range adjustment model are indicated in a floating point precision.

10. The video encoding device of claim 1, wherein first learned affine range adjustment model and the second learned affine range adjustment model are at least one of a linear model or a logarithmic model.

11. The video encoding device of claim 1, wherein the processor is further configured to:

determine whether to use channel dynamic range adjustment on the feature tensor, wherein the channel dynamic range adjustment is performed based on a determination to use channel dynamic range adjustment on the feature tensor.

12. A video decoding device, the video decoding device comprising:

a processor configured to:

obtain a feature tensor associated with a video;

perform channel dynamic range restoration on the feature tensor, wherein the channel dynamic range restoration comprises applying a first learned affine range adjustment model to a first channel associated with the feature tensor and applying a second learned affine range adjustment model to a second channel associated with the feature tensor, and wherein an adjusted feature tensor is determined based on the performed channel dynamic range restoration;

determine reconstructed features based on the performed channel dynamic range restoration; and decode the video based on the determined reconstructed features.

13. The video decoding device of claim 12, wherein the processor is further configured to:

obtain a channel dynamic range adjustment indication, wherein the channel dynamic range adjustment indication indicates to use channel dynamic range restoration on the tensor frame, wherein the channel dynamic range restoration is performed based on the indication to use channel dynamic range restoration on the tensor frame, wherein the channel dynamic range adjustment indication indicates to use the first learned affine range adjustment model and the second learned affine range adjustment model, wherein the first learned affine range adjustment model and the second learned affine range adjustment model are indicated in a floating point precision.

14. The video decoding device of claim 11, wherein the processor is further configured to obtain a channel dynamic range adjustment indication, wherein the channel dynamic range adjustment indication indicates at least one of, to bypass channel dynamic range restoration on the unpacked feature tensor, the first learned affine range adjustment model, the second learned affine range adjustment model, and to use the first learned affine range adjustment model and the second learned affine range adjustment model for channel dynamic range restoration associated with the feature tensor;

to use at least one previously decoded range adjustment model for channel dynamic range restoration associated with the feature tensor, or to use at least one pre-configured range adjustment model for channel dynamic range restoration associated with the feature tensor.

15. A video encoding method, the method comprising:

obtaining a feature tensor associated with a video;

performing a channel dynamic range adjustment, wherein the channel dynamic range adjustment comprises applying a first learned affine range adjustment model to a first channel associated with the feature tensor and applying a second learned affine range adjustment model to a second channel associated with the feature tensor, and wherein an adjusted feature tensor is determined based on the performed channel dynamic range adjustment; and encoding the video based on the adjusted feature tensor.

16. The video encoding method of claim 15, wherein the first learned affine range adjustment model is associated with a first scale parameter and a first shift parameter, wherein the second range learned affine adjustment model is associated with a second scale parameter and a second shift parameter.

17. The video encoding method of claim 16, wherein first scale parameter and the first shift parameter are determined using the first learned affine range adjustment model associated with the first channel, and wherein the second scale parameter and the second shift parameter are determined using the second learned affine range adjustment model associated with the second channel.

18. The video encoding method of claim 15, wherein the feature tensor is a normalized feature tensor, wherein the normalized feature tensor is obtained based on a minimum value and a maximum value associated with the feature tensor, and wherein based on a determination to use channel dynamic range adjustment on the feature tensor, the minimum value is zero.

19. The video encoding method of claim 15, wherein the method further comprises:

sending a channel dynamic range adjustment indication, wherein the channel dynamic range adjustment indication indicates to perform channel dynamic range adjustment and indicates at least one of:

to bypass channel dynamic range restoration on the unpacked feature tensor, the first learned affine range adjustment model, the second learned affine range adjustment model, and to use the first learned affine range adjustment model and the second learned affine range adjustment model for channel dynamic range restoration associated with the feature tensor;

to use at least one previously decoded range adjustment model for channel dynamic range restoration associated with the feature tensor, or to use at least one pre-configured range adjustment model for channel dynamic range restoration associated with the feature tensor.

20. The video encoding method of claim 15, wherein the method further comprises:

sending a channel dynamic range adjustment indication, wherein the channel dynamic range adjustment indication indicates the first learned affine range adjustment model and the second learned affine range adjustment model, and wherein the first learned affine range adjustment model and second learned affine range adjustment model are indicated in a floating point precision.

* * * * *